(12) United States Patent
Shimakawa

(10) Patent No.: US 11,836,394 B2
(45) Date of Patent: Dec. 5, 2023

(54) IMAGE FORMING APPARATUS AND METHOD OF CONTROLLING IMAGE FORMING APPARATUS

(71) Applicant: CANON KABUSHIKI KAISHA, Tokyo (JP)

(72) Inventor: Yasunori Shimakawa, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/951,316

(22) Filed: Sep. 23, 2022

(65) Prior Publication Data

US 2023/0128864 A1 Apr. 27, 2023

(30) Foreign Application Priority Data

Oct. 25, 2021 (JP) .................. 2021-173914

(51) Int. Cl.
*G06F 3/12* (2006.01)
(52) U.S. Cl.
CPC ............ *G06F 3/1204* (2013.01); *G06F 3/123* (2013.01); *G06F 3/1208* (2013.01); *G06F 3/1231* (2013.01); *G06F 3/1254* (2013.01)
(58) Field of Classification Search
None
See application file for complete search history.

(56) References Cited

U.S. PATENT DOCUMENTS

| 11,144,260 B2 | 10/2021 | Kakitsuba |
| 2012/0268753 A1* | 10/2012 | Tokuda .................. G06F 3/1285 358/1.2 |
| 2014/0344663 A1* | 11/2014 | Joel ........................ H04L 67/02 715/234 |
| 2020/0225890 A1* | 7/2020 | Kakitsuba ............. G06F 3/1285 |

FOREIGN PATENT DOCUMENTS

JP 2020-113060 A 7/2020

\* cited by examiner

*Primary Examiner* — Frantz Bataille
(74) *Attorney, Agent, or Firm* — VENABLE LLP

(57) ABSTRACT

An image forming apparatus includes a printer, a controller that installs an application in the image forming apparatus, with the application holding sheet setting information for a predetermined sheet, and a communicator that transmits the sheet setting information held by the installed application to a printer driver installed in an information processing apparatus connected to the image forming apparatus. The communicator receives a print job including the sheet setting information from the information processing apparatus, and the printer prints, based on the sheet setting information included in the received print job, an image on the predetermined sheet.

9 Claims, 20 Drawing Sheets

FIG. 12

| SETTING FOR SHEET NO. A1 OF TRANSPORT COMPANY A |
|---|
| SETTING FOR SHEET NO. A1 OF TRANSPORT COMPANY A IS COMPLETED |

| MANUAL TRAY: NO. A1, TRANSPORT COMPANY A |
| CASSETTE 1: PLAIN A4 SHEET |
| CASSETTE 2: PLAIN A4 SHEET |
| CASSETTE 3: PLAIN A4 SHEET |

CANCEL | OK

FIG. 13

| SETTING FOR SHEET TYPE B-C OF B EXPRESS |
|---|
| SETTING FOR SHEET TYPE B-C OF B EXPRESS IS COMPLETED |

| MANUAL TRAY: TYPE B-C, B EXPRESS |
|---|
| CASSETTE 1: PLAIN A4 SHEET |
| CASSETTE 2: PLAIN A4 SHEET |
| CASSETTE 3: PLAIN A4 SHEET |

CANCEL | OK

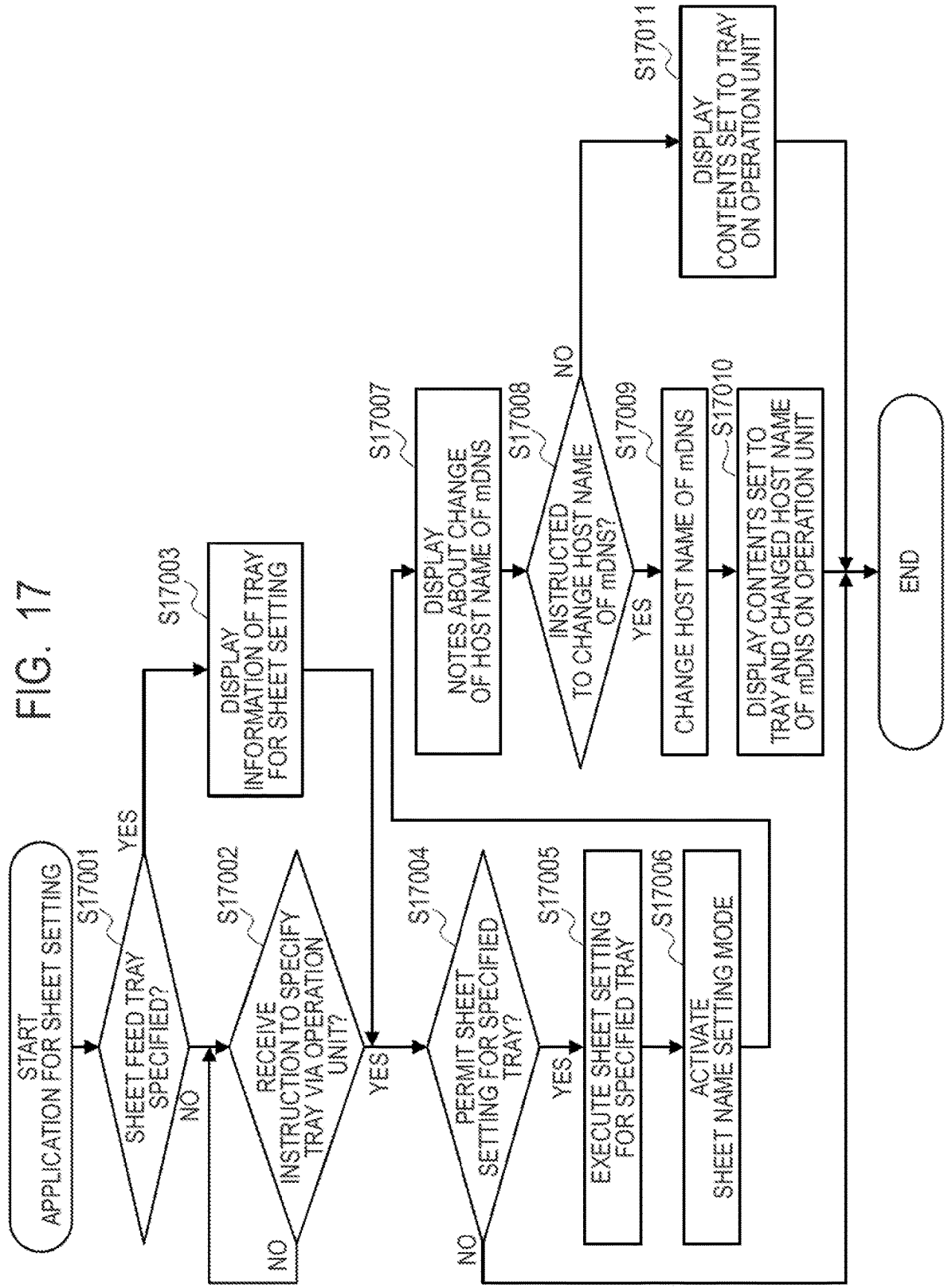

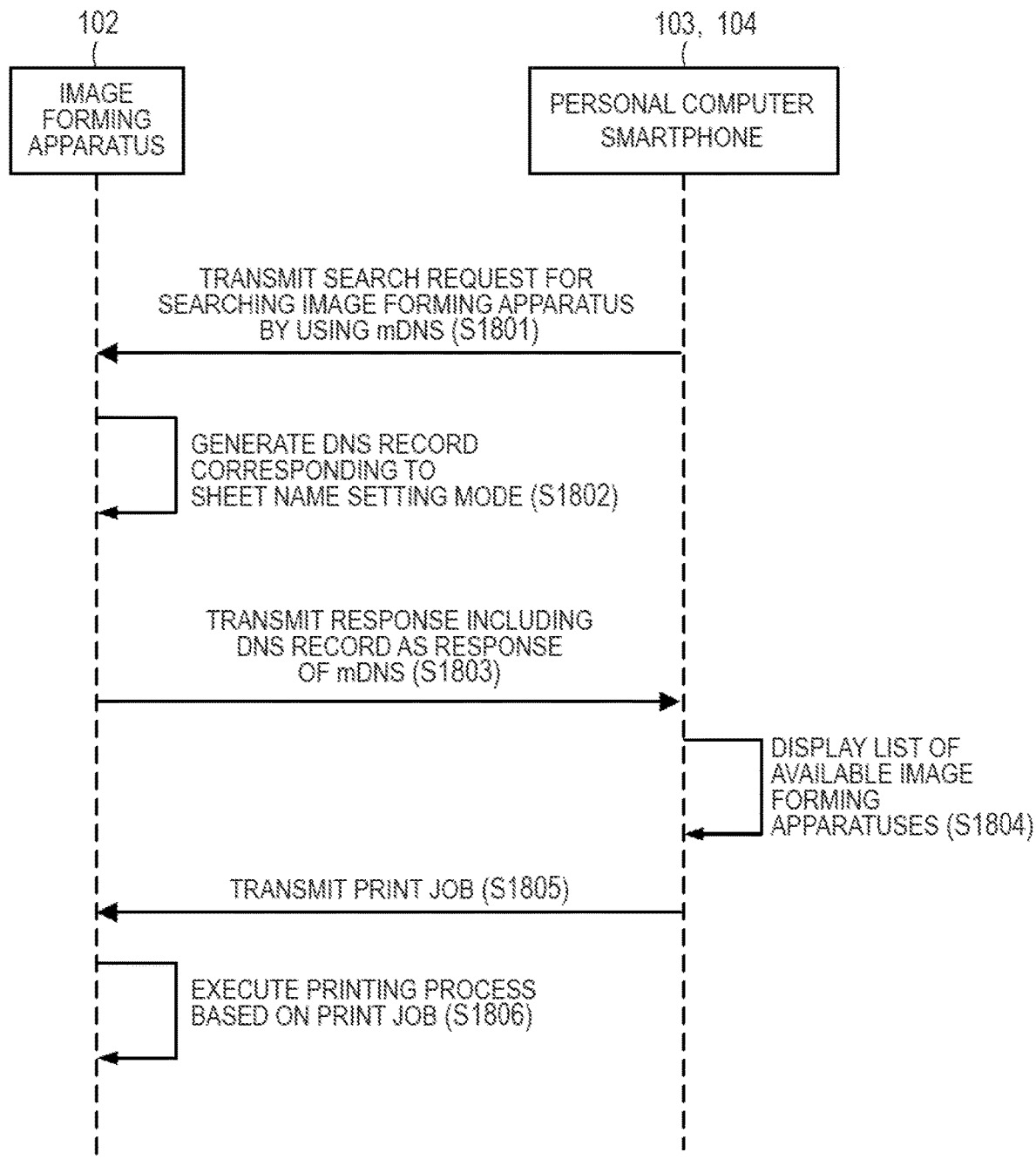

FIG. 20A

| SETTING FOR SHEET NO. A1 OF TRANSPORT COMPANY A |
|---|
| NAME OF mDNS IS CHANGED AS SHOWN BELOW |
| BEFORE CHANGE: Printer-102 |
| AFTER CHANGE: Printer-102_TransportA_No.A1 |
| | CANCEL | OK | |

2102 — CANCEL
2101 — OK

FIG. 20B

| SETTING FOR SHEET NO. A1 OF TRANSPORT COMPANY A |
|---|
| SETTING FOR SHEET NO. A1 OF TRANSPORT COMPANY A IS COMPLETED |
| NAME OF mDNS: Printer-102_TransportA_No.A1 |

| MANUAL TRAY: NO. A1, TRANSPORT COMPANY A |
|---|
| CASSETTE 1: PLAIN A4 SHEET |
| CASSETTE 2: PLAIN A4 SHEET |
| CASSETTE 3: PLAIN A4 SHEET |

| CANCEL | OK |

IMAGE FORMING APPARATUS AND METHOD OF CONTROLLING IMAGE FORMING APPARATUS

BACKGROUND

Field

The present invention relates to an image forming apparatus and a method of controlling the image forming apparatus.

Description of the Related Art

An image forming apparatus such as a printer or a multifunction device converts print data input from an information processing device such as a personal computer, a smartphone or a tablet and outputs the converted data. A printer driver is installed in the information processing device, and print data are generated by the printer driver. A user performs print settings such as a sheet size, a sheet type like plain paper, thick paper and label paper, a color/monochrome setting and a duplex setting via a print setting screen of the printer driver, and instructs a printing operation. The printer driver generates print data according to the print settings.

Japanese Patent Application Laid-Open No. 2020-113060 proposes a technique for installing a dedicated printer driver for each printer type and for each sheet type in a personal computer and performing a printing operation on a dedicated sheet using the printer driver.

In case of performing a printing operation on a dedicated sheet such as a package invoice or a label sheet, a user needs to make a setting corresponding to the dedicated sheet via the print setting screen of the printer driver. However, it is difficult for the user to properly specify all the items of the setting according to the dedicated sheet. If the printing is performed with improper settings, printing conditions are not met, and toner peeling, melting of the glue of the label sheet, and ink bleeding may occur, and expensive special sheet may be wasted.

As disclosed in Japanese Patent Application Laid-Open No. 2020-113060, a method of performing a printing operation on a dedicated sheet without necessity for a user to perform specific settings for the printing is applicable by using a dedicated printer driver for each printer type and each sheet type. However, it is necessary to install a dedicated printer driver for each printer type and each sheet type, which is troublesome for the user. Also, the printer driver has to be installed every time the sheet is changed, so it is not easy to use.

The present invention has been made in order to solve the above problems. An object of the present invention is to provide a mechanism which allows a user to easily specify settings suitable for a special sheet such as a dedicated sheet via a printer driver for performing a printing operation.

SUMMARY

According to an aspect of the present disclosure, an image forming apparatus comprises an installing unit configured to install an application in the image forming apparatus, the application holding sheet setting information for a predetermined sheet; and a providing unit configured to provide sheet setting information held by the installed application for a printer driver connected to the image forming apparatus.

Further features of the present invention will become apparent from the following description of exemplary embodiments with reference to the attached drawings.

BRIEF DESCRIPTION OF THE DRAWINGS

FIG. 12 shows a screen indicating completion of sheet settings for sheet feeders provided by the sheet setting application.

FIG. 13 shows a screen indicating completion of sheet settings for sheet feeders provided by the sheet setting application.

FIG. 17 is a flowchart showing the operation of the sheet setting application executed by the image forming apparatus according to the third embodiment.

FIG. 18 shows a sequence of processes executed by a personal computer or smartphone for searching an image forming apparatus to execute a printing operation.

FIG. 20A is a diagram showing a confirmation screen for changing an mDNS name provided by the sheet setting application.

FIG. 20B is a diagram showing a screen indicating completion of changing the mDNS name and the sheet setting provided by the sheet setting application.

DESCRIPTION OF THE EMBODIMENTS

The embodiments of the present invention will now be described with reference to the drawings. The following embodiment does not limit the present invention recited in claims, and not all of the combinations of features described in the embodiment are essential for achieving the objective of the invention.

First Embodiment

Figure 1:
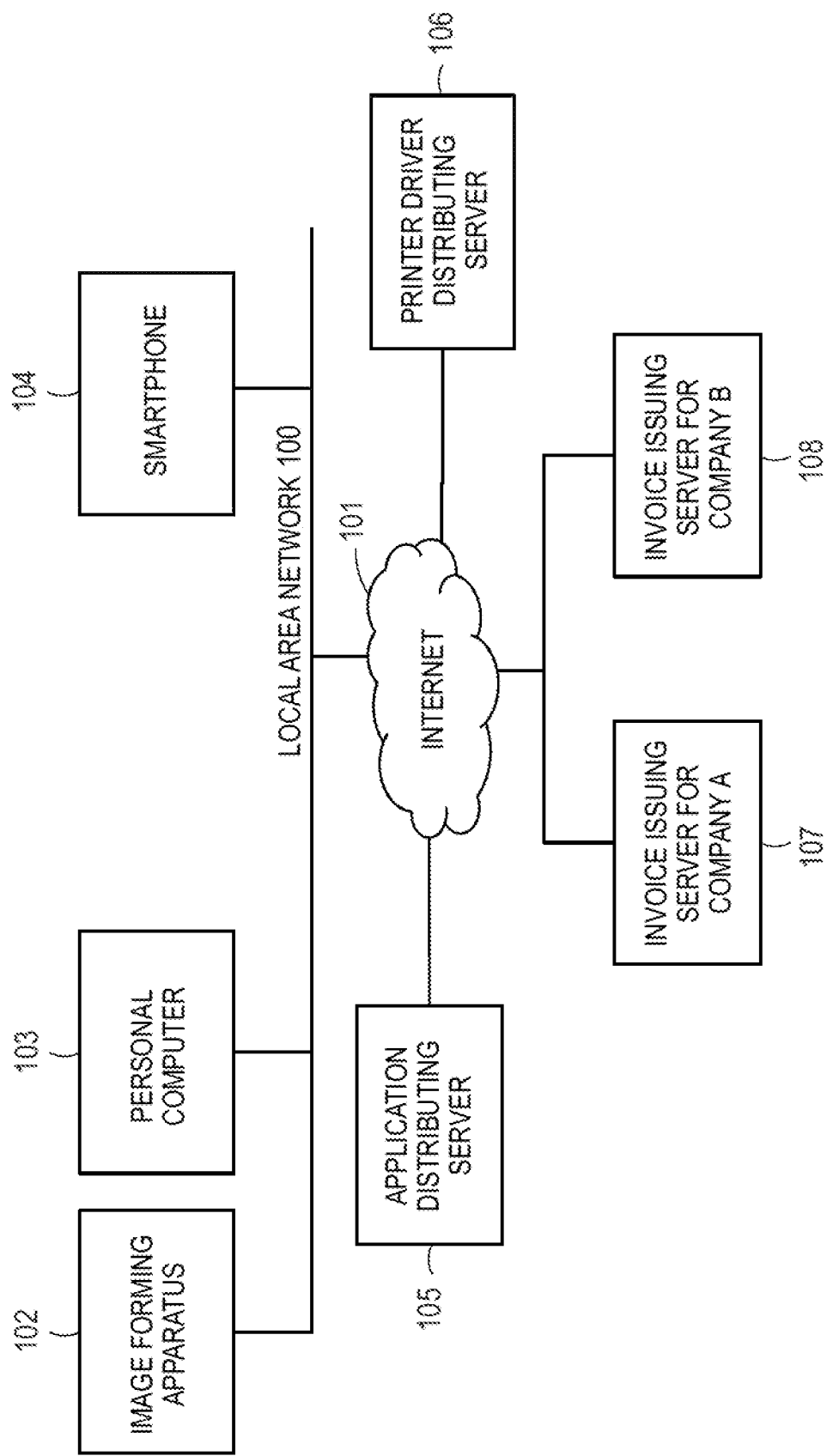
FIG. 1 shows a network configuration of the printing system according to the present embodiment.

FIG. 1 shows a network configuration of the printing system according to the embodiment of the present invention.

On a local area network ("LAN") 100, an image forming apparatus 102, a personal computer (PC) 103, and a smartphone 104 are connected to communicate with each other. The LAN 100 may be a wired network or a wireless network. The LAN 100 is connected to the Internet 101 via a router (not shown).

An application distributing server 105, a printer driver distributing server 106, and invoice issuing service servers 107 and 108 for respective companies are arranged on the Internet 101. The image forming apparatus 102, the personal computer 103, and the smartphone 104 can communicate with the application distributing server 105, the printer driver distributing server 106, and the respective invoice issuing service servers 107 and 108 through the Internet 101.

The image forming apparatus 102 is a multifunction printer (MFP; multifunction peripheral). The personal computer (PC) 103 and the smartphone 104 are information processing devices used to perform a printing operation on the image forming apparatus 102. The information processing apparatus includes a tablet-type computer (not shown).

The application distributing server 105 is a server system for distributing application programs (hereinafter referred to as "applications") for use in the image forming apparatus 102.

The printer driver distributing server 106 is a server system for distributing printer drivers that generate print data and perform print settings for performing a printing operation with the image forming apparatus 102. The invoice issuing service server (for example, the invoice issuing server 107 for a "company A", the invoice issuing server 108 for a "company B", etc.) for each company is a server system for issuing an invoice and generating an invoice image. Each of the servers 105 to 108 may be implemented by a single computer or multiple computers, or may be implemented using cloud computing technology.

The PC 103 and the smartphone 104 can acquire an invoice image by notifying and inquiring the invoice ID issued by the respective invoice issuing service servers 107 and 108 to the respective invoice issuing service servers 107 and 108. The PC 103 and the smartphone 104 generate print data and perform print settings for printing the obtained invoice image by using the image forming apparatus 102, and transmit the print data and print settings to the image forming apparatus 102. The image forming apparatus 102 prints the received print data according to the print setting.

Figure 2:
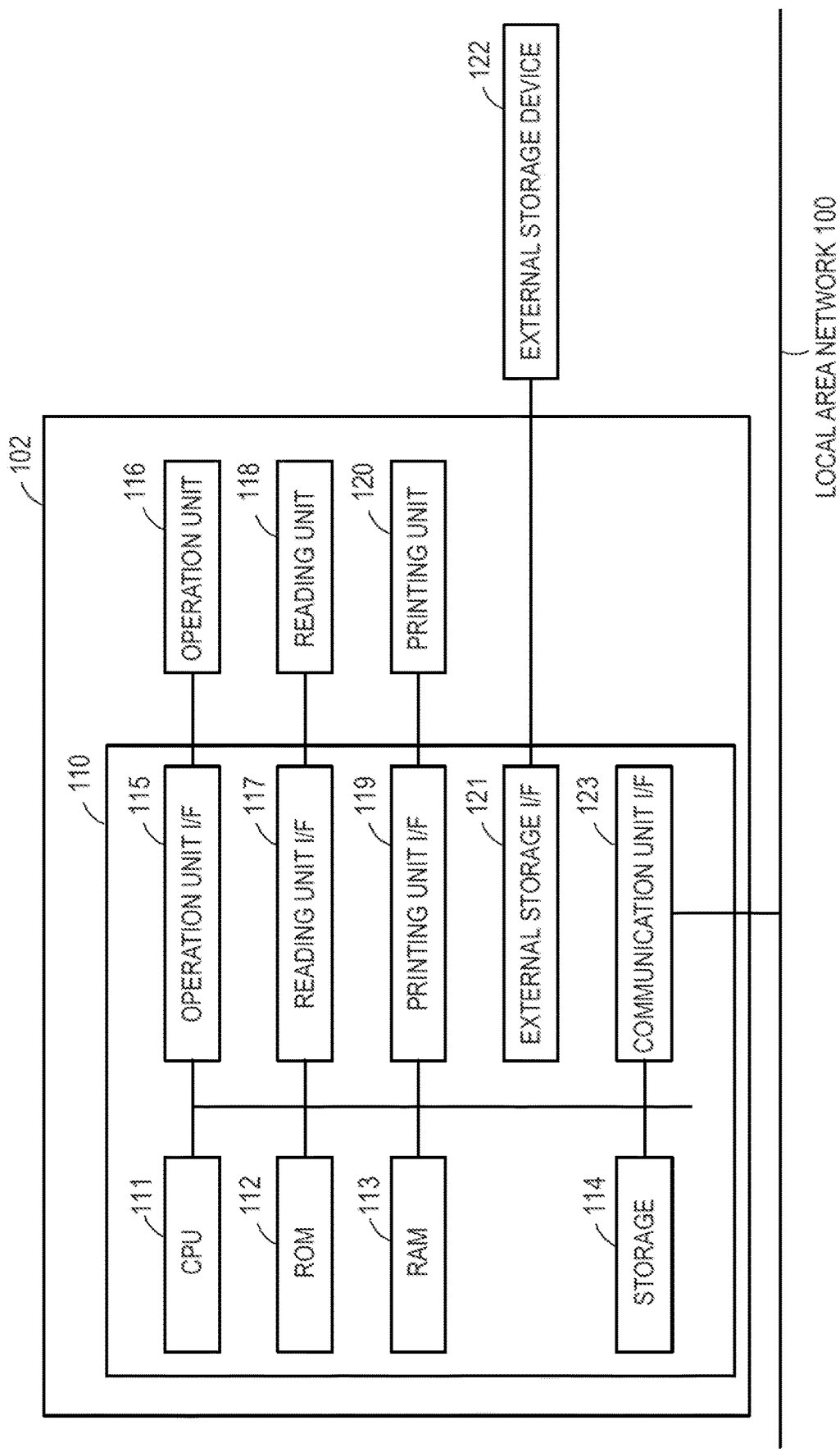
FIG. 2 shows a configuration of the image forming apparatus according to the present embodiment.

FIG. 2 is a block diagram showing an example of the configuration of the image forming apparatus 102.

A control unit 110 including a central processing unit (CPU) 111 controls the operation of the entire image forming apparatus 102. The CPU 111 reads the control program stored in a read-only memory (ROM) 112 or a storage 114, and performs various controls such as read control and print control.

The ROM 112 is a storage device for storing a control program executable by the CPU 111, and is composed of, for example, a flash ROM. The ROM 112 also stores a boot program and font data. A random-access memory (RAM) 113 is a main storage memory of the CPU 111 and is used as a temporary storage area for deploying various control programs stored in the work area, the ROM 112, and the storage 114.

The storage 114 stores image data, print data, an address book, various programs, and various setting information. In the present embodiment, a flash memory is assumed as the storage 114. However, an auxiliary storage device such as a solid state drive (SSD), a hard disk drive (HDD), or an embedded multimedia card (eMMC) may be used as the storage 114.

In the present embodiment, one CPU 111 included in the image forming apparatus 102 executes each of the processes shown in the flowchart described later using one memory (RAM 113). However, for example, multiple CPUs, RAMs, ROMs, and storages may be cooperatively used together to execute the respective processes shown in the flowchart described later. Further, a hardware circuit such as an ASIC or an FPGA may be used to execute part of the processing.

An operation unit interface 115 is an interface connecting an operation unit 116 with the control unit 110. The operation unit 116 displays information to the user and detects an input from the user.

A reading unit interface 117 is an interface connecting a reading unit 118 with the control unit 110. The reading unit 118 reads an image in a document and converts the image into image data such as binary data. The image data generated by the reading unit 118 is transmitted to an external device, stored in an external recording device, or printed on a recording sheet.

A printing unit interface 119 is an interface connecting a printing unit 120 with the control unit 110. The CPU 111 transfers image data to be printed (target image data) to the printing unit 120 via the printing unit interface 119. The printing unit 120 prints an image on a recording sheet fed from a sheet feed cassette (not shown) by using toner supplied from a cartridge (not shown). The printing unit 120 is not limited to an electrophotographic method, and may be an inkjet method or any other printing method.

An external storage interface 121 is an interface connecting an external storage device 122 with the control unit 110. The CPU 111 can store image data in the external storage device 122 or read data from the external storage device 122 via the external storage interface 121. Although the present embodiment considers a universal serial bus (USB) interface as the external storage interface 121 and a USB flash drive as the external storage device 122, other external storage devices such as an SD card may be used.

A communication unit interface 123 is an interface connecting the LAN 100 with the control unit 110. The control unit 110 is connected to the LAN 100 via the communication unit interface 123.

Figure 3:
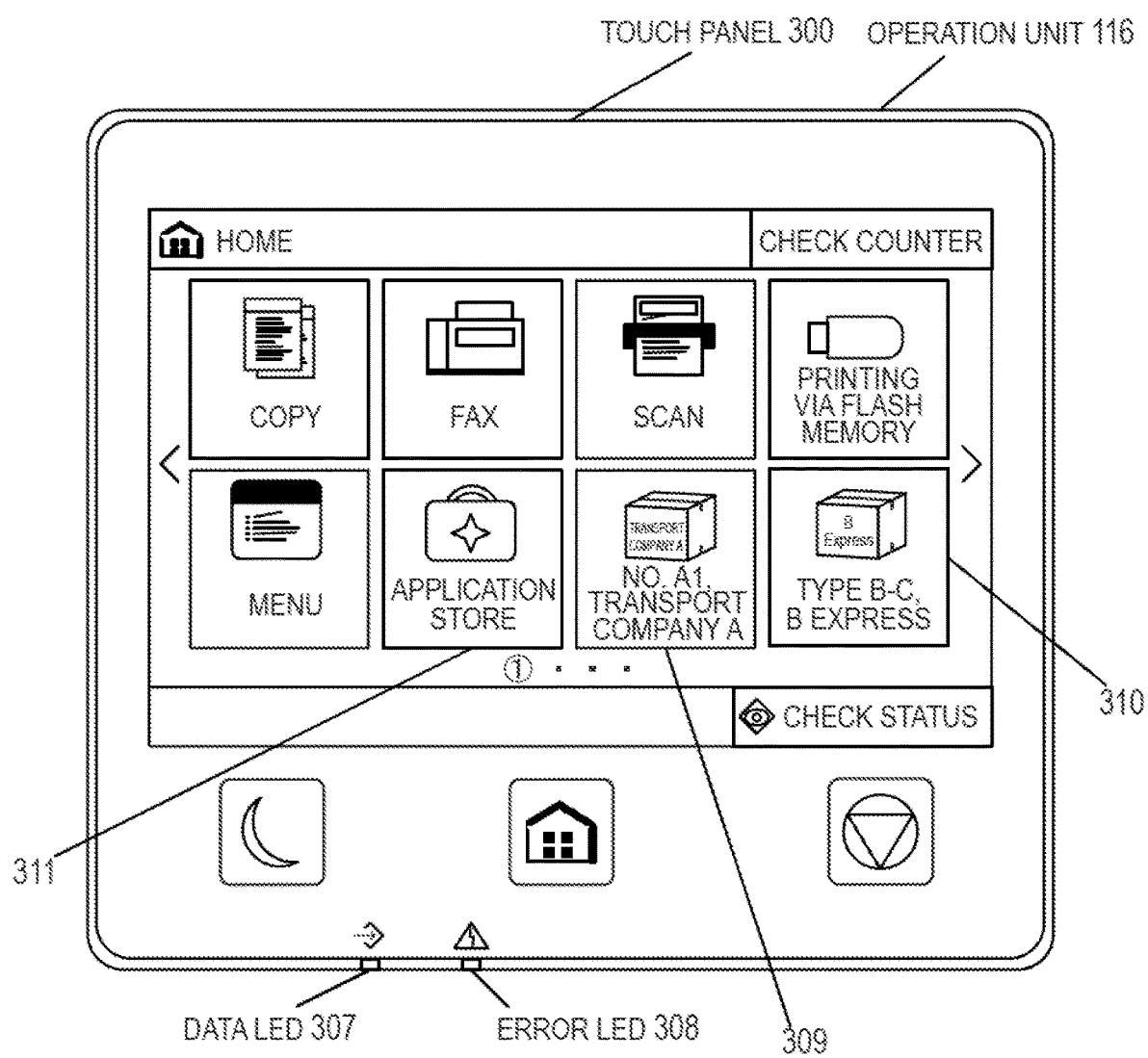
FIG. 3 shows the operation unit of the image forming apparatus according to the present embodiment.

FIG. 3 is a diagram describing the operation unit 116.

The operation unit 116 has a touch panel 300, a data LED 307 and an error LED 308.

The touch panel 300 functions as a display unit and an operation input unit. The data LED 307 and the error LED 308 notify the user of the status of the image forming apparatus 102. The data LED 307 lights up during execution of an electronic mail or a file transmission job.

The error LED 308 turns on if any error occurs in the image forming apparatus 102.

The touch panel 300 shown in FIG. 3 displays a home screen displayed immediately after the image forming apparatus 102 is activated. The home screen is a screen for instructing execution of each function of the image forming apparatus 102. The home screen displays touch images of common settings, copy, scan, menu, application store button 311, address book and other functions performed by image forming apparatus 102.

On the home screen, a button 309 for "No. A1 of transport company A" and a button 310 for "type B-C of B express" are displayed. The button 309 for "No. A1 of transport company A" and the button 310 for "type B-C of B express" correspond to a sheet setting application according to the present embodiment. The sheet setting application corresponding to the button 309 and the button 310 is preinstalled in the ROM 112. Alternatively, the sheet setting application corresponding to the button 309 and the button 310 can be downloaded from the application distributing server 105 to install the application in image forming apparatus 102.

The following section describes how to install the sheet setting application.

Figure 4:
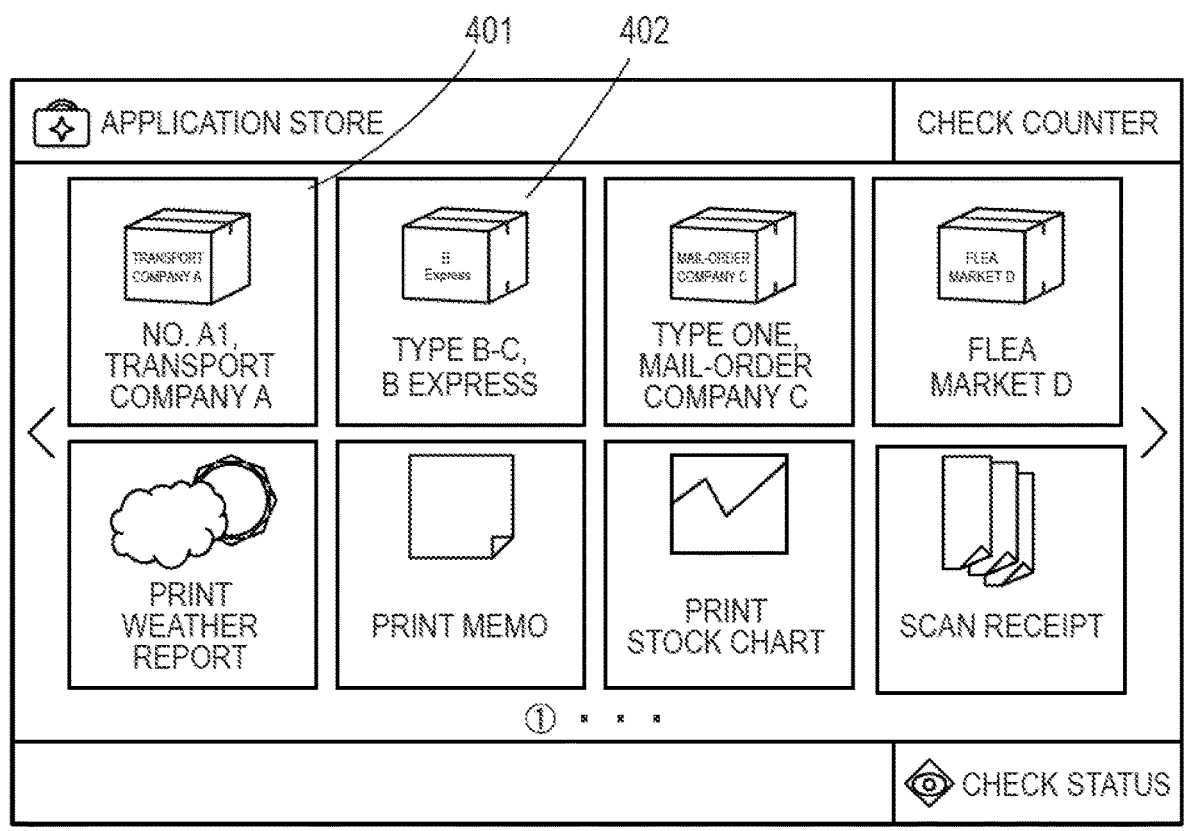
FIG. 4 shows a screen of an application store.

For example, if a user presses the application store button 311, the image forming apparatus 102 acquires application information from the application distributing server 105 via the LAN 100 and the Internet 101, and displays a screen of an application store shown in FIG. 4 using the operation unit 116.

FIG. 4 is a diagram showing an example of the screen of application store according to the present embodiment.

Figure 5:
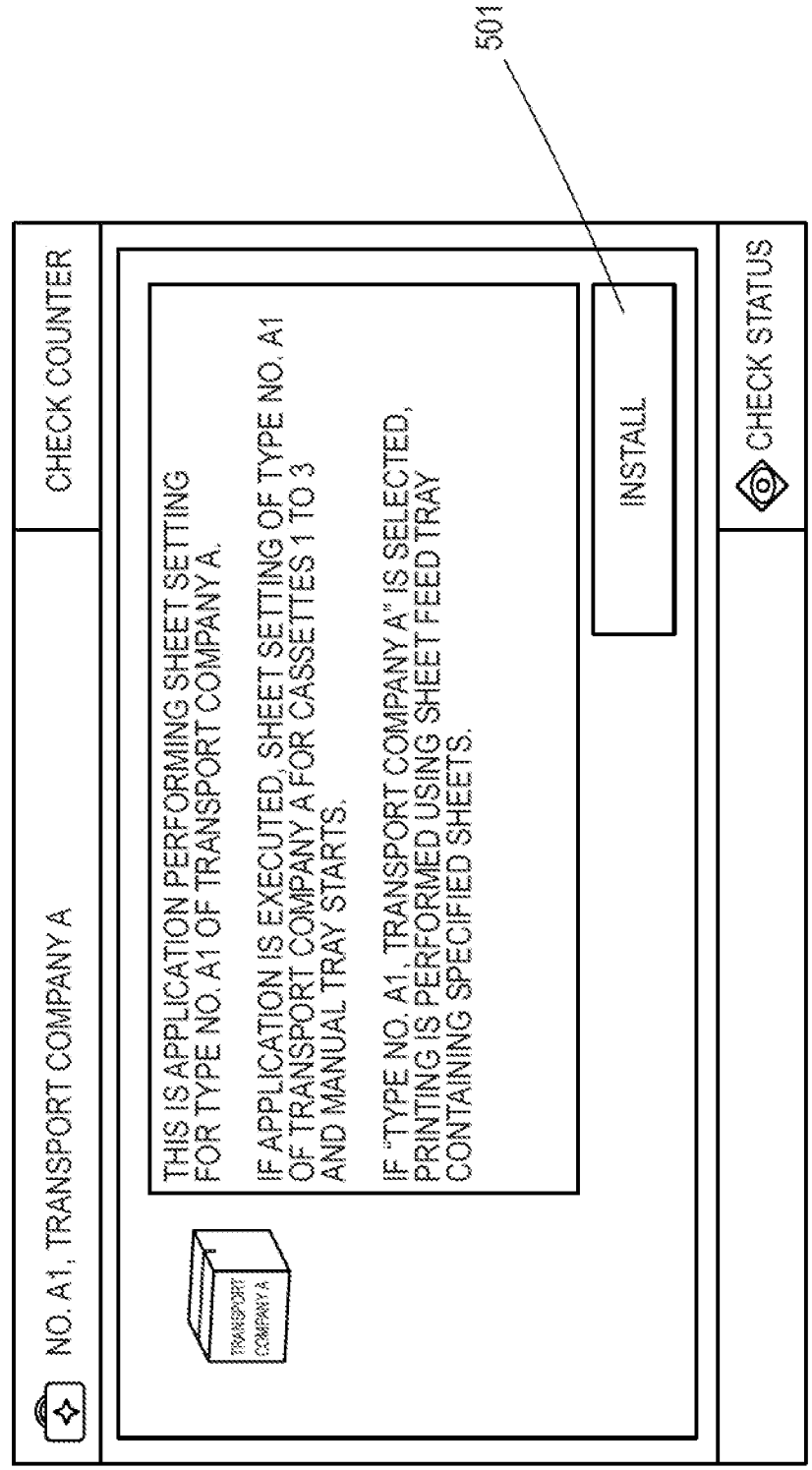
FIG. 5 shows a screen for describing a sheet setting application.

If the user selects the required application (for example, "No. A1 of transport company A" (401), "type B-C of B express" (402), etc.) via the screen of application store as shown in FIG. 4, the image forming apparatus 102 displays the screen for describing the application shown in FIG. 5 using the operation unit 116.

FIG. 5 is a diagram showing an example of a screen showing descriptions of the sheet setting application according to the present embodiment.

If the user presses an install button 501 via the screen for describing the application as shown in FIG. 5, the image forming apparatus 102 notifies the application distributing server 105 of the fact that the button is pressed. In response to the notification, an application installer is downloaded from the application distributing server 105 to the image forming apparatus 102 and stored in the ROM 112, the storage 114 or the external storage device 122. By executing the installer of the downloaded application and installing the application, the application can be utilized by the image forming apparatus 102. Thus, for example, the button 309 for "No. A1 of transport company A" and the button 310 for "type B-C of B express" are displayed on the home screen, and the sheet setting application corresponding to the buttons is enabled. That is, the image forming apparatus 102 has a function of installing an application having sheet setting information for a predetermined sheet in the image forming apparatus 102.

As described above, the sheet setting application corresponding to the button 309 and the button 310 and the like can be installed in the image forming apparatus 102. If the sheet setting application is installed, the sheet setting information corresponding to the sheet setting application (the sheet setting information held by the sheet setting application) is stored in the storage 114 or the like according to a template of the sheet setting application. The stored sheet settings include information on a sheet size, a sheet type, a sheet orientation, a sheet name, print density, capability of double-sided printing, a color profile, an icon image displayed by the operation unit 116 (e.g., the button 309 for "No. A1 of transport company A"), and a sheet setting screen (for example, see FIG. 7).

If the sheet setting application specifies a sheet feeder, the information of the sheet feeder is also included in the sheet settings. If the icon image of the button 309 or the like is pressed, the sheet setting is performed by using the sheet setting information stored as described above.

If the sheet setting application is installed, the image forming apparatus 102 provides the sheet setting information of the sheet setting application to the printer driver connected to the image forming apparatus 102. The printer driver for generating print data to be printed by the image forming apparatus 102 is installed in the PC 103. The printer driver operating on the PC 103 is connected to the image forming apparatus 102 for making an inquiry in order to set a model of devices or to update a status, for example. The inquiry from the printer driver to the image forming apparatus 102 may be made if the print setting screen of the printer driver is activated, or may be made according to an instruction from the user, or may be made periodically, or may be made at other timings. After installing the sheet setting application, the image forming apparatus 102 provides the sheet setting information of the sheet setting application to the printer driver connected to the image forming apparatus 102 in response to an inquiry from the printer driver. The sheet setting information provided here includes, for example, a sheet size, a sheet type, a sheet orientation, a sheet name, print density, capability of a double-sided printing, a color profile, and the like. Thus, the printer driver acquires the sheet setting information of the installed sheet setting application from the image forming apparatus 102 as sheet setting information for a predetermined sheet. Then, the printer driver adds the sheet setting information acquired as described above as a favorite setting of a name corresponding to a sheet name included in the sheet setting information. Detailed descriptions will be given below with reference to FIG. 6.

Figure 6:
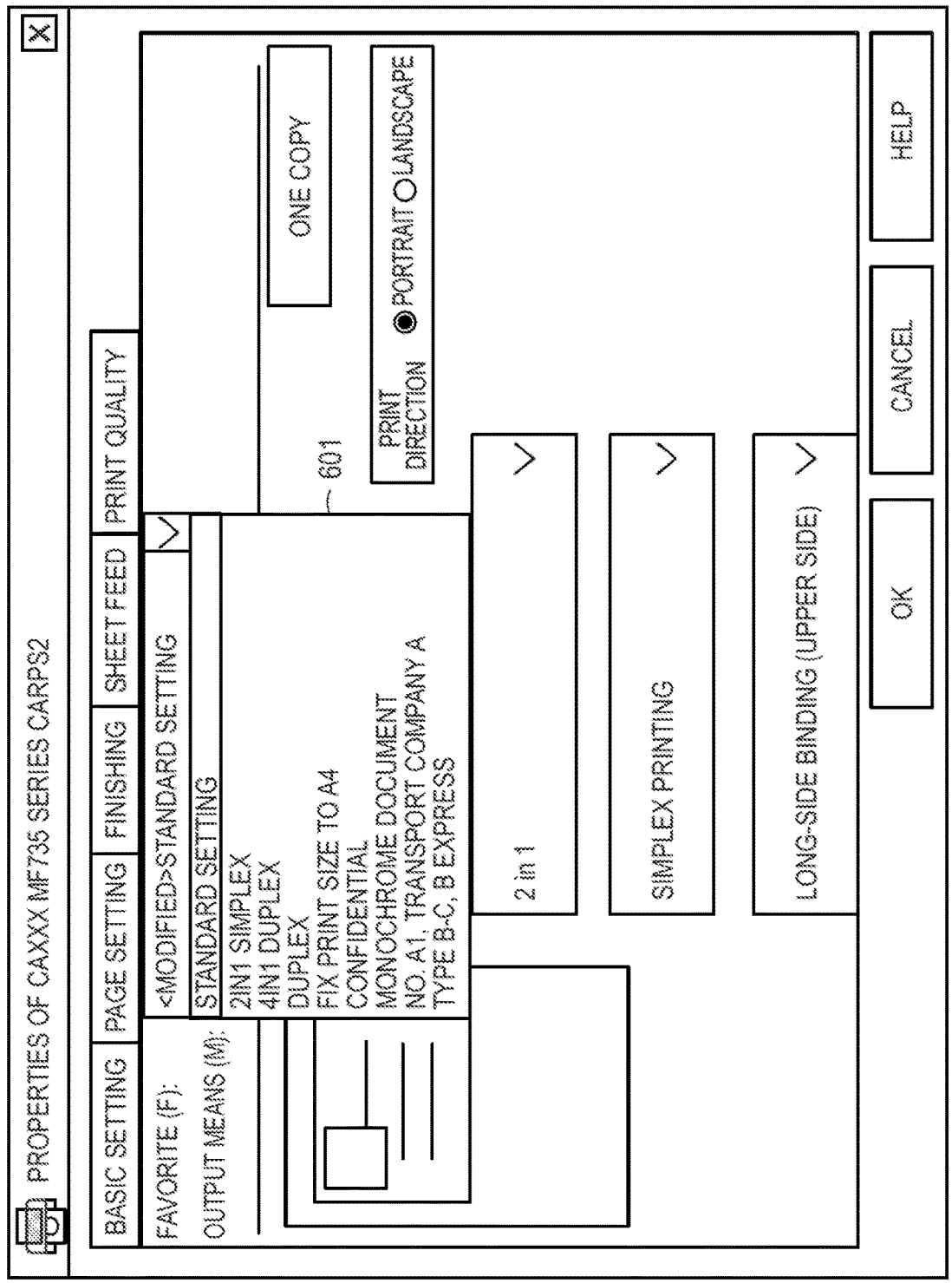
FIG. 6 shows a print setting screen of a printer driver.

FIG. 6 is a diagram describing the print setting screen of the printer driver operating on the PC 103 according to the present embodiment.

In the following description, the printer driver operating on the PC 103 acquires the sheet setting information corresponding to the sheet name "No. A1 of transport company A" and the sheet setting information corresponding to the sheet name "type B-C of B express" from the image forming apparatus 102 as an example. In this case, the printer driver adds favorite settings "No. A1 of transport company A" and "type B-C of B express" to "favorite 601" of the print setting screen of the printer. The favorite setting "No. A1 of transport company A" added to the favorite 601 corresponds to the sheet setting information for the sheet name "No. A1 of transport company A". The favorite setting "type B-C of B express" added to the favorite 601 corresponds to the sheet setting information for the sheet name "type B-C of B express". The user selects "No. A1 of transport company A" or "type B-C of B express" from the favorite 601 and instructs to perform a printing operation. Due to the above instruction, a print job including the selected favorite setting (including the sheet setting and the sheet name of the corresponding sheet) as a print setting is transmitted to the image forming apparatus 102. That is, the sheet type corresponding to the sheet setting information received from the image forming apparatus 102 is added to the print setting screen of the printer driver as one of options. If the added sheet type is selected and the printing operation is instructed, print data in which sheet setting information corresponding to the sheet type is designated as print setting is generated.

If the sheet setting application is executed in the image forming apparatus 102 to perform the sheet setting for the corresponding sheet, the image forming apparatus 102 displays the sheet setting screen (for example, the screen shown in FIGS. 7 and 8) in the operation unit 116. The sheet setting screen may be displayed at timing when the sheet setting application is executed and the sheet setting is performed, or may be displayed at timing when the sheet feeder associated with the sheet setting is opened, or at other timings.

Figure 7:
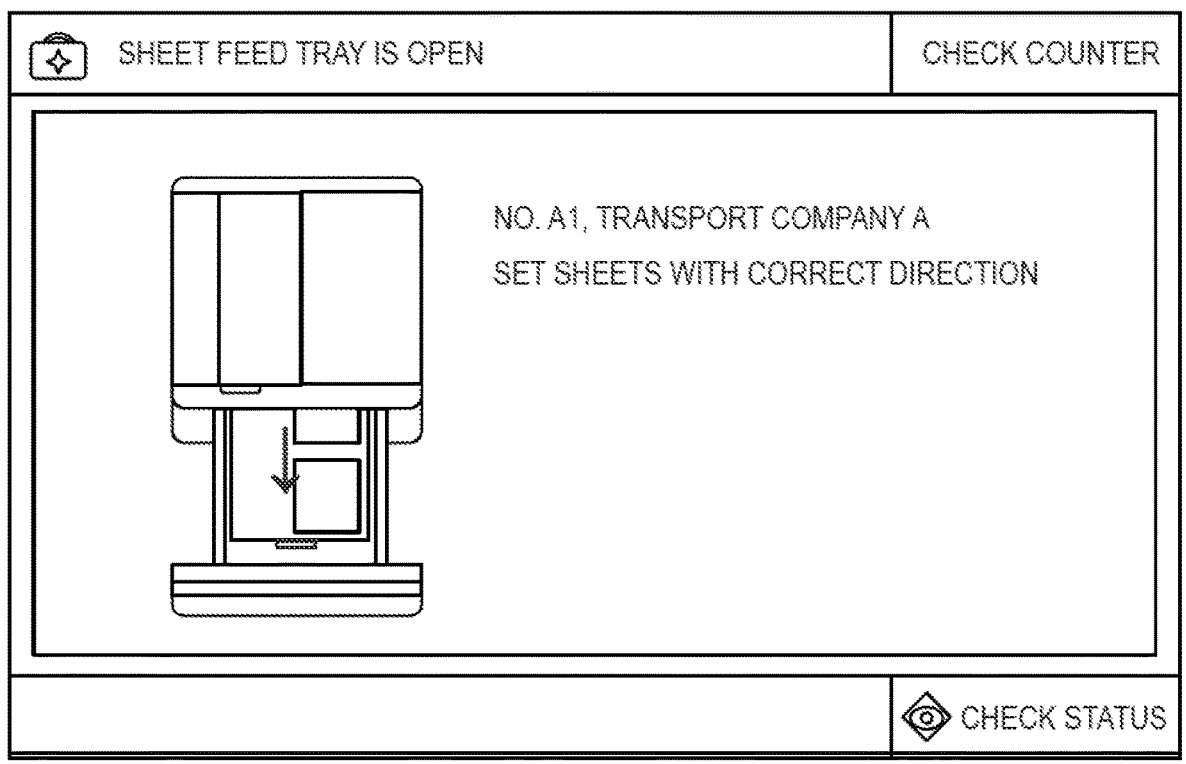
FIG. 7 shows a sheet setting screen (if there is a sheet image).
Figure 8:
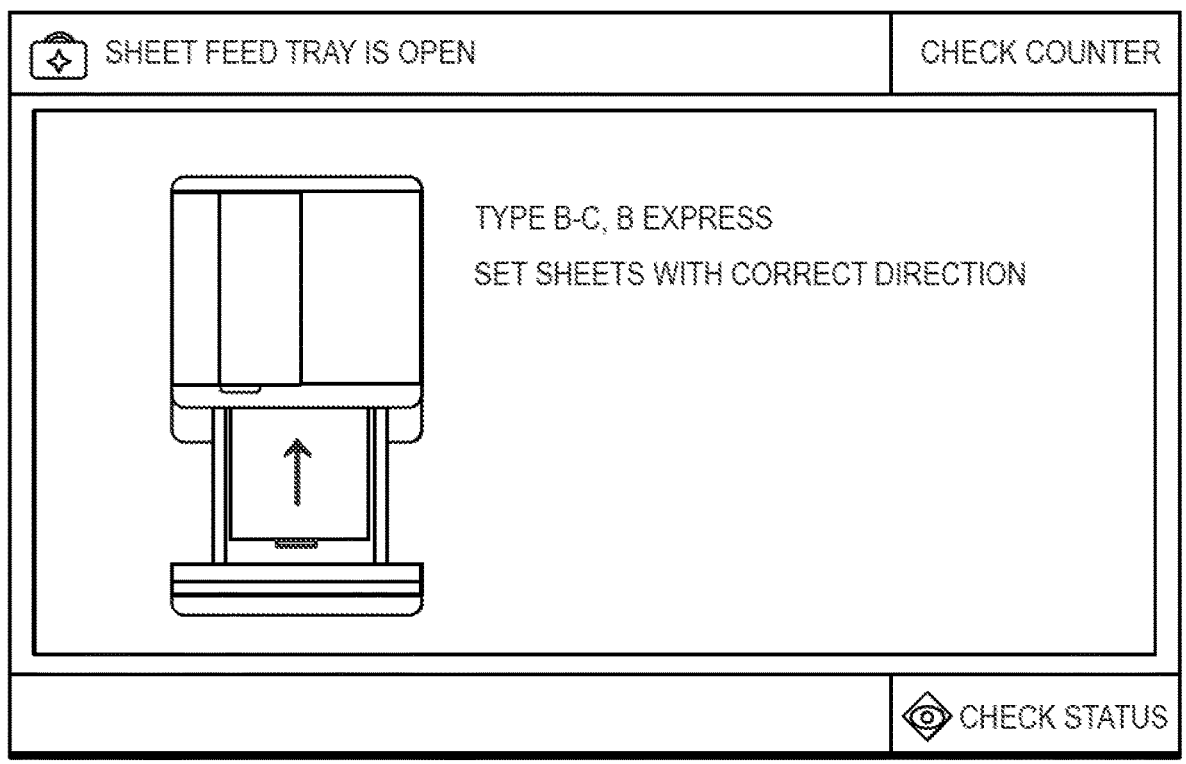
FIG. 8 shows a sheet setting screen (if there is no sheet image).

FIGS. 7 and 8 are diagrams showing examples of the sheet setting screens displaying an instruction for the sheet setting in the image forming apparatus 102. In particular, FIGS. 7 and 8 shows the sheet setting screens when the sheet feeder for which the sheet setting is made via the sheet setting application is opened. For example, data or information for displaying the sheet setting screen shown in FIGS. 7 and 8 is stored in the storage 114 or the like when the sheet setting application is installed as described above.

If the sheet setting application holds an image of a sheet to be loaded, a screen showing the orientation of the sheet with an arrow or the like is displayed on the touch panel 300 of the operation unit 116 as a sheet setting screen together with the image of the sheet in accordance with the sheet loading orientation as shown in FIG. 7.

If the sheet setting application does not hold an image of the sheet to be loaded, a screen showing only the sheet orientation with an arrow or the like is displayed on the touch panel 300 of the operation unit 116 as a sheet setting screen as shown in FIG. 8.

The image forming apparatus 102 may be configured to automatically close the sheet setting screen when detecting an opening or closing operation of the sheet feeder corresponding to the displayed sheet setting screen.

If the image forming apparatus 102 detects the opening/closing operation of the sheet feeder after performing the sheet setting for the sheet feeder by the sheet setting application, the image forming apparatus 102 determines that the sheet feeder is operated to set the sheet, and stores information indicating the sheet setting operation having been performed in the storage 114 or the like. If the sheet setting for the sheet feeder is changed, the image forming apparatus 102 erases information indicating that the sheet feeder is operated to load sheet.

The sheet setting operation of the sheet setting application will be described below.

Figure 9:
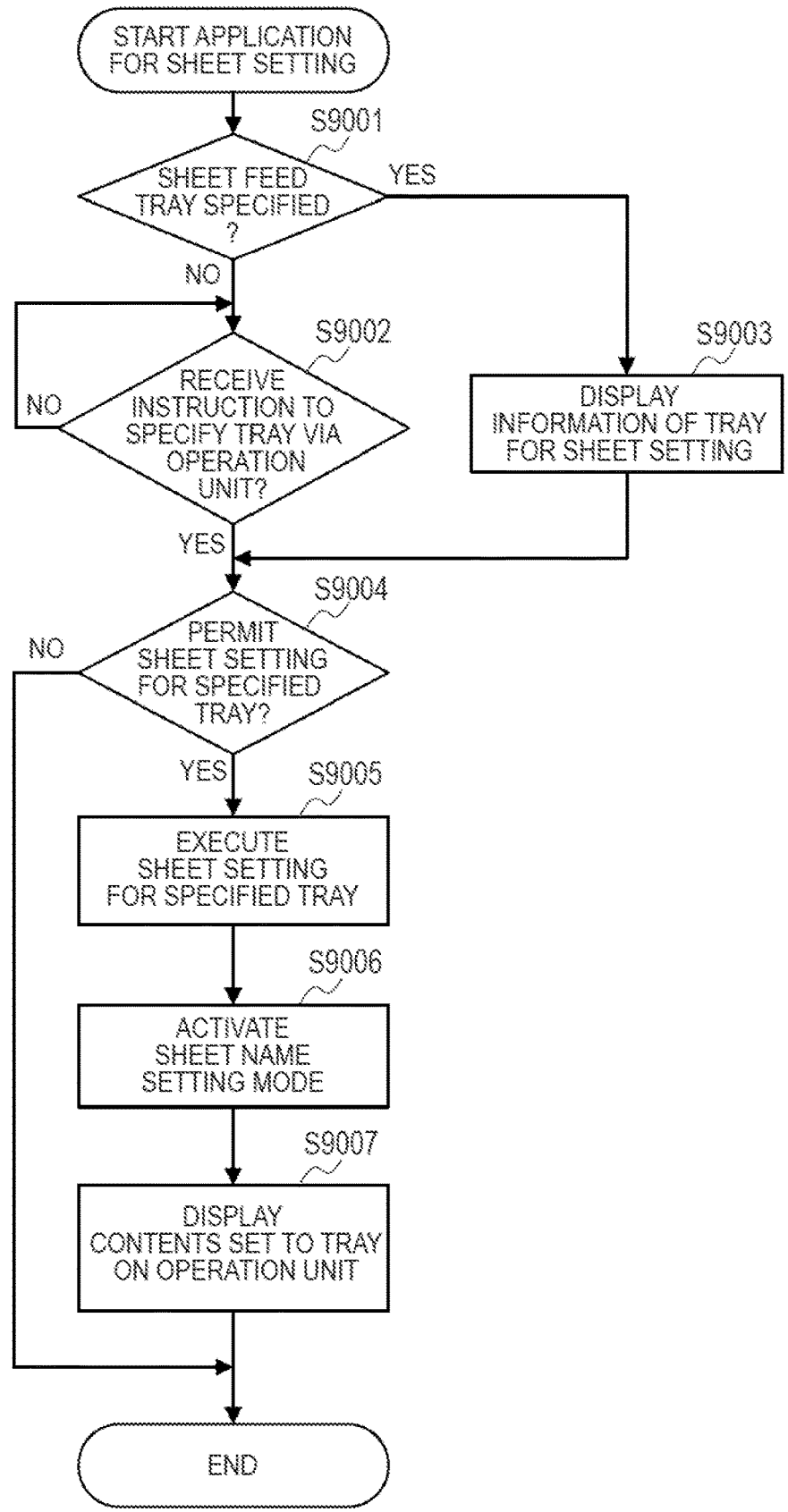
FIG. 9 is a flowchart showing the operation of the sheet setting application executed by the image forming apparatus according to the first embodiment.

FIG. 9 is a flowchart describing the operation of the sheet setting application according to the image forming apparatus 102 of the first embodiment. The processing shown in the flowchart is realized by the CPU 111 reading and executing the control program stored in the ROM 112 or the storage 114.

In response to a press of the sheet setting application button (the button 309 for "No. A1 of transport company A", the button 310 for "type B-C of B express", etc.) displayed in the operation unit 116, the CPU 111 executes the sheet setting application, which causes the process of this flowchart to start.

First, in step S9001, the CPU 111 checks whether the stored sheet setting corresponding to the pressed sheet setting application button specifies the sheet feeder to be set. Here, for example, it is considered here that the sheet setting corresponding to the button 309 for "No. A1 of transport company A" does not specify the sheet feeder to be set, and the sheet setting corresponding to the button 310 for "type B-C of B express" specifies that the sheet feeder to be set is a manual feed tray.

If the sheet feeder is not specified as for the button 309 (No in step S9001), the CPU 111 advances the process to step S9002.

In step S9002, the CPU 111 determines if an instruction for specifying a sheet feeder to be set is received via the operation unit 116. For example, the CPU 111 displays a screen as shown in FIG. 10 in the operation unit 116, and waits until a sheet feeder is specified.

Figure 10:
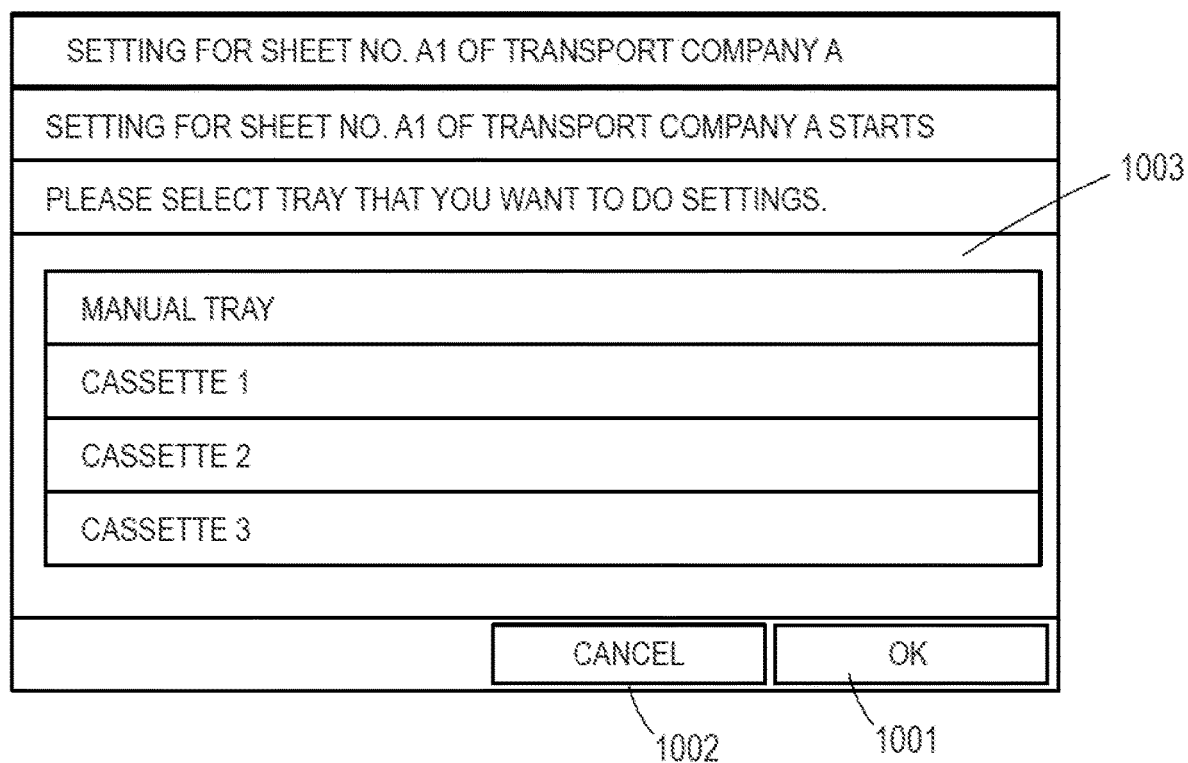
FIG. 10 shows a setting screen of a sheet feeder provided by the sheet setting application.

FIG. 10 is a diagram showing an example of a setting screen for a sheet feeder provided by the sheet setting application. The screen is used to specify a sheet feeder to be set. In FIG. 10, a screen corresponding to the button 309 for "No. A1 of transport company A" is shown. A user designates or specifies a sheet feeder from a sheet feeder list 1003 of the screen as shown in FIG. 10, and presses an "OK" button 1001 or a "Cancel" button 1002. Pressing the button 1001 indicates permission of the sheet feed setting, and pressing the button 1002 indicates cancellation of the sheet feed setting. If the OK button 1001 or the cancel button 1002 is pressed, the CPU 111 advances the process to step S9004. The processing after step S9004 will be described later.

On the other hand, if the sheet setting specifies a sheet feeder as the button 310 for "type B-C of B express" (Yes in S9001), the CPU 111 advances the process to step S9003.

In step S9003, the CPU 111 receives an operation for confirming the permission of the sheet setting via the operation unit 116. For example, the CPU 111 displays a screen as shown in FIG. 11 on the operation unit 116, and waits until an operation to confirm the permission of the sheet setting is performed.

Figure 11:
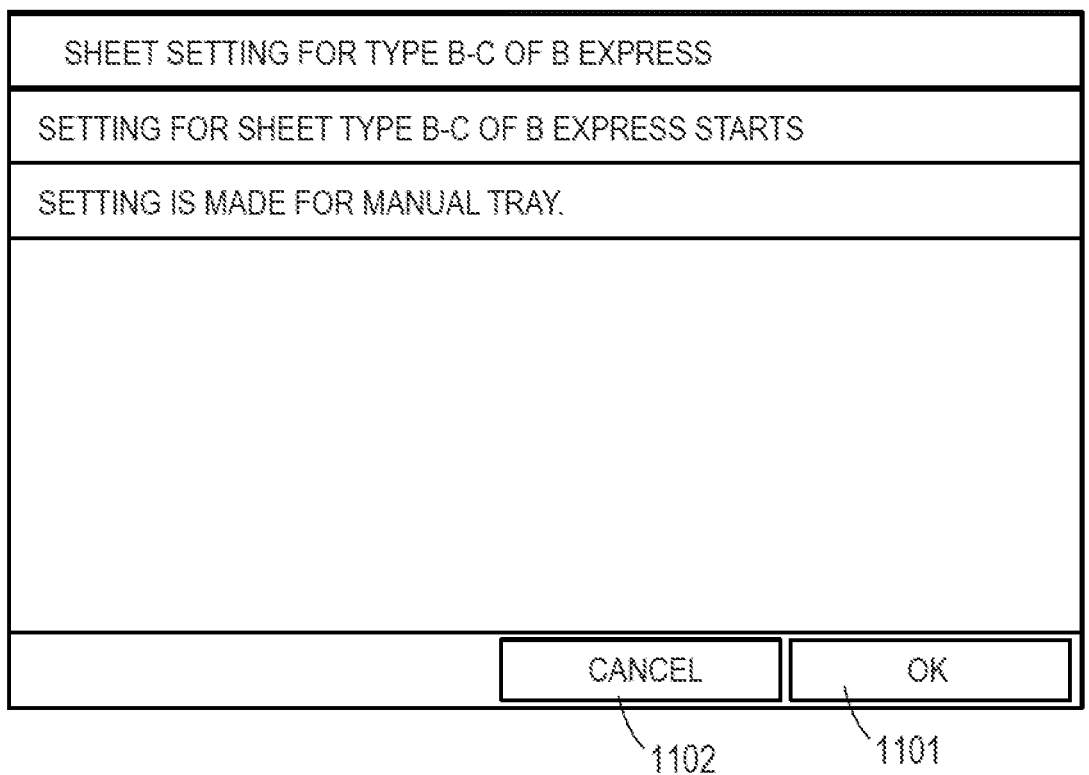
FIG. 11 shows a confirmation screen of a sheet feeder provided by the sheet setting application.

FIG. 11 is a diagram showing an example of a screen for confirming the sheet feeder provided by sheet setting application, which is a screen for confirming the permission of the sheet setting. In FIG. 11, a screen corresponding to the button 310 for "type B-C of B express" is shown. The user confirms the permission of the sheet setting on the screen as shown in FIG. 11, and presses the "OK" button 1101 or the "Cancel" button 1102. Pressing the OK button 1101 indicates permission of the sheet feed setting, and pressing the cancel button 1102 indicates cancellation of the sheet feed setting. If the OK button 1101 or the cancel button 1102 is pressed, the CPU 111 advances the process to step S9004.

In step S9004, the CPU 111 determines whether to permit or cancel the sheet setting. If the sheet setting is canceled, that is, if the cancel button 1002 or 1102 is pressed (No in step S9004), the CPU 111 terminates the process of this flowchart.

On the other hand, if the sheet setting is permitted, that is, if the OK button 1001 or 1101 is pressed (Yes in step S9004), the CPU 111 advances the process to step S9005.

In step S9005, the CPU 111 performs sheet setting on the designated sheet feeder. The sheet settings set for the sheet feeder are, for example, a sheet size, a sheet type, a sheet orientation, a sheet name, print density, capability of duplex printing, a color profile, and a sheet setting screen. As described above, information or data for the sheet setting is stored in the storage 114 or the like when the sheet setting application is installed.

Next, in step S9006, the CPU 111 activates a "sheet name setting mode". If a mode is changed to the "sheet name setting mode", a print job in which a sheet name is specified is executed on a sheet having the matched sheet name. While the sheet name setting mode is activated, the corresponding sheet setting application button (such as the buttons 309, 310, etc.) may be highlighted (e.g., by color-inversing). If the sheet setting application button (the buttons 309, 310, etc.) having the sheet setting is pressed again, the CPU 111 cancels the sheet setting, restores the current sheet setting to the previous sheet setting, and deactivates the sheet name setting mode. The sheet name setting mode is also deactivated if the sheet setting of the sheet feeder set by the sheet setting application is changed by a manual operation.

Next, in step S9007, the CPU 111 displays a screen showing the setting contents as shown in FIG. 12 or FIG. 13 in the operation unit 116, and ends the process of this flowchart.

FIG. 12 is a diagram showing an example of a screen indicating completion of the sheet feeder/sheet settings provided by the sheet setting application, and corresponds to a screen for displaying the setting contents in case of pressing the button 309 for "No. A1 of transport company A" to perform the sheet setting for the manual feed tray.

FIG. 13 is a diagram showing an example of a screen indicating completion of the sheet setting provided by the sheet setting application, and corresponds to a screen for displaying the setting contents in case of pressing the button 310 for "type B-C of B express" to perform the sheet setting for the manual feed tray according to the settings of the application.

Note that the CPU 111 may display a sheet setting screen as shown in FIG. 7 or FIG. 8 on the operation unit 116 to guide how to set sheets when the OK button shown in FIG. 12 or FIG. 13 is pressed. At this time, the CPU 111 may drive a motor (not shown) or the like to automatically open the sheet feeder in which the sheet setting has been performed for more clearly prompting to set sheets.

Figure 14:
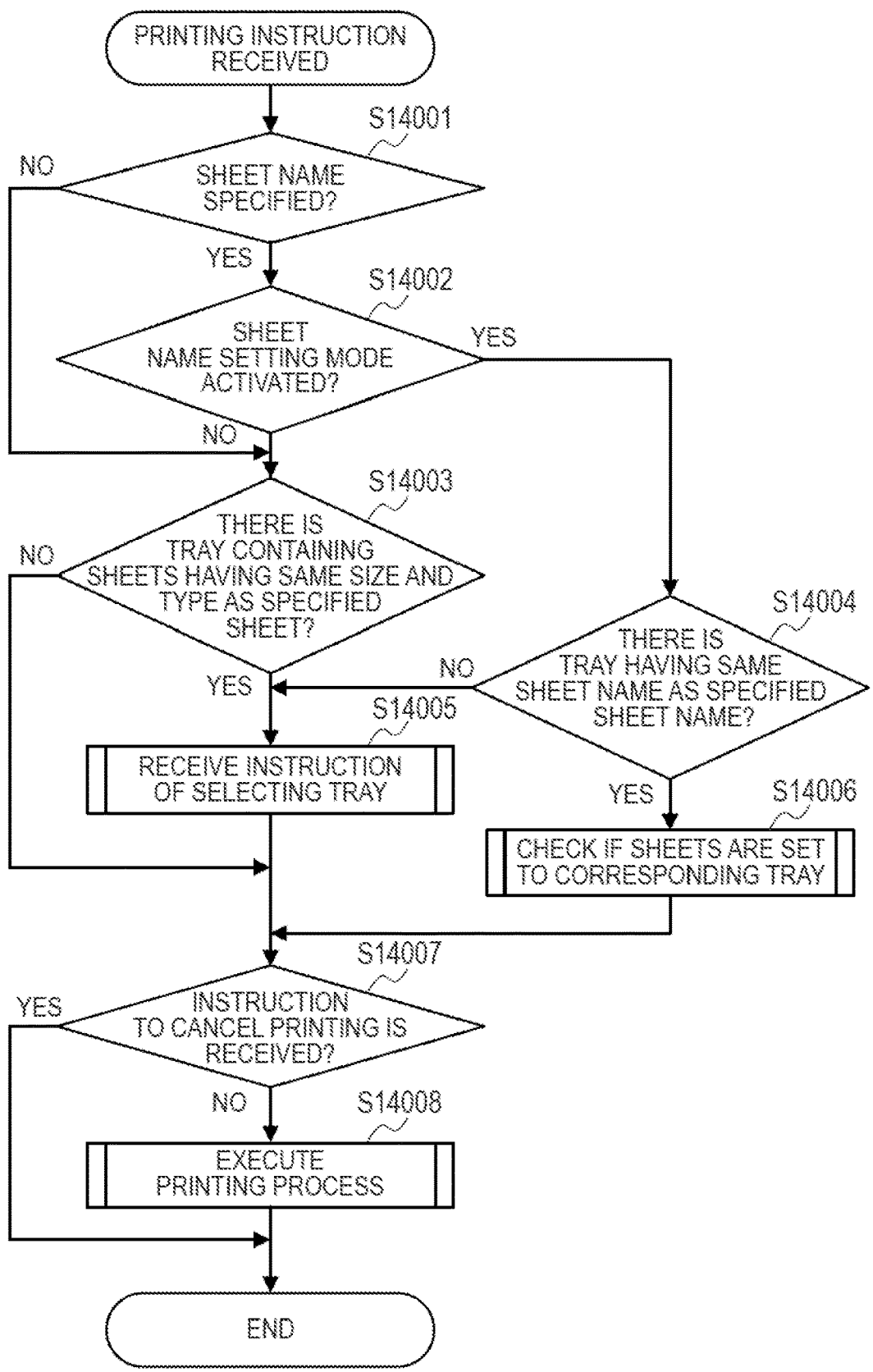
FIG. 14 is a flowchart showing the operation of the image forming apparatus according to the first embodiment if receiving an instruction to execute a printing operation from a personal computer.

FIG. 14 is a flowchart describing the operation of the image forming apparatus 102 according to the first embodiment in response to receiving a printing instruction from the PC 103. The processing shown in the flowchart is realized by the CPU 111 reading and executing the control program stored in the ROM 112 or the storage 114.

In response to receiving a print job from the PC 103 generated by a printer driver operating on the PC 103, the CPU 111 starts the process of this flowchart.

First, in step S14001, the CPU 111 determines whether or not a sheet name is specified in the print job received from the PC 103. If there is no sheet name specified (No in step S14001), the CPU 111 advances the process to step S14003.

On the other hand, if there is a sheet name specified (Yes in step S14001), the CPU 111 advances the process to step S14002.

In step S14002, the CPU 111 checks whether or not the above-mentioned sheet name setting mode is activated. If the sheet name setting mode is activated (Yes in step S14002), the CPU 111 advances the process to step S14004.

In step S14004, the CPU 111 checks whether there is a sheet feeder corresponding to the sheet name specified in the input print job. If there is no sheet feeder corresponding to the specified sheet name (No in step S14004), the CPU 111 advances the process to step S14005. The processing after S14005 will be described later.

On the other hand, if there is a sheet feeder corresponding to the specified sheet name (Yes in step S14004), the CPU 111 advances the process to step S14006.

In step S14006, the CPU 111 determines whether or not a user has performed an operation to load sheets in the corresponding sheet feeder after executing the sheet setting application. If the CPU 111 determines that the operation to load sheets has been performed by the user, the CPU 111 advances the process to step S14007. On the other hand, if the CPU 111 determines that the user has not performed the operation to load sheets, the CPU 111 displays the sheet setting screen as shown in FIG. 7 or FIG. 8. After confirming that the user has performed the operation to load sheets, the CPU 111 advances the process to step S14007.

If the CPU 111 determines that the sheet name setting mode is not activated in step S14002 (No in step S14002), the CPU 111 advances the process to step S14003.

In step S14003, the CPU 111 determines whether there is a sheet feeder corresponding to sheets having the sheet size and sheet type specified in the input print job. If there is no sheet feeder corresponding to sheets having the specified sheet size and sheet type (No in step S14003), the CPU 111 advances the process to step S14007. The processing after S14007 will be described later.

If the CPU 111 determines that there is a sheet feeder corresponding to the sheets having the specified sheet size and sheet type (Yes in step S14003), the CPU 111 advances the process to step S14005.

In step S14005, the CPU 111 receives a selection of a sheet feeder for feeding sheets via a screen for selecting a sheet feeder (not shown) displayed in the operation unit 116. Upon receiving an instruction of the selection or cancellation from the user, the CPU 111 advances the process to step S14007.

In step S14007, the CPU 111 determines whether or not to cancel the printing operation. If an instruction for cancelling the printing operation is received from the user in step S14005, the CPU 111 determines that the printing operation is to be cancelled. In other cases, the CPU 111 determines not to cancel the printing operation.

In the case of canceling the printing in step S14007 (Yes in step S14007), the CPU 111 terminates the process of this flowchart.

On the other hand, if the printing is not cancelled (No in step S14007), the CPU 111 advances the process to step S14008.

In step S14008, the CPU 111 performs the printing operation according to the print setting of the print job.

The sheets managed by the sheet setting application are not limited to invoices used for home delivery services or the like, but may be various forms such as label sheets, preprint sheets, delivery slips, a withholding tax bills, or payment slips.

As described above, according to the image forming apparatus 102 of the present embodiment, the sheet setting application is executed for each sheet via a button such as the buttons 309, 310, etc. displayed in the operation unit 116, which allows the sheet setting application to set a sheet name, sheet settings, and a sheet setting screen for the image forming apparatus. That is, just pressing a button allows to set sheet settings and sheet names required for the sheet feeder. Therefore, the present embodiment can reduce the time and effort of the user who performs each setting.

The sheet setting application having sheet setting information for a predetermined sheet as described above can be installed in the image forming apparatus 102. The image forming apparatus 102 provides the sheet setting information of the installed sheet setting application for the printer driver connected to the image forming apparatus 102. For example, after the sheet setting application is installed, the image forming apparatus 102 provides the print setting information of the sheet setting application for the printer driver in response to an inquiry from the printer driver connected to the image forming apparatus 102. The printer driver that generates print data to be printed by the image forming apparatus 102 can add "favorite settings" based on the sheet setting information provided from the image forming apparatus 102. That is, if the printer driver is connected to the image forming apparatus 102, the printer driver registers the sheet setting information for a predetermined sheet provided from the image forming apparatus 102 in a list used for collectively performing the print settings. Since the sheet setting information provided from the image forming apparatus 102 includes the optimized setting for performing a printing operation on the corresponding sheet, the user can specify the print setting optimized for the sheet through a simple operation to perform the printing operation. Therefore, the present embodiment enables to suppress the occurrence of various problems such as the toner peeling, the melting of the glue of the label sheet, the ink bleeding, and wasting expensive dedicated sheets.

Since the sheet setting information for special sheets such as dedicated (company-specific) sheets can be obtained from the image forming apparatus, there is no need to install a special printer driver for each printer and for each sheet type, which improves usability. Further, since the sheet setting information for dedicated sheets is registered in the printer driver, users can easily determine the image forming apparatus capable of performing a printing operation on the dedicated sheets from a favorite item of the printer driver when performing the printing operation.

If the sheet name is set in the sheet setting application, the image forming apparatus 102 displays the sheet setting screen in the operation unit 116 to indicate how to set sheets such as the orientation of the sheets as shown in FIGS. 7 and 8. Thus, it is possible to prevent printing errors caused by sheet settings such as setting of sheets in a wrong orientation. In addition, a user can check the sheet setting screen displayed in the operation unit of the image forming apparatus while setting sheets, so that the user can easily set the sheets. According to the prior art, such as the above-described Japanese Patent Application Laid-Open No. 2020-113060, it is a screen provided by a personal computer that indicates how to set sheets which is performed on the printer side. Thus, it is necessary for the user to set up the printer while checking the screen of the personal computer, which could be burdensome. In particular, if the printer is installed at a distant place from a personal computer, it is not easy for the user to check the screen of the personal computer while setting up the printer, and the user sometimes moves back and forth between the personal computer and the printer many times to check how to set sheets. Contrary to the prior art, the sheet setting method according to the present embodiment indicates and displays how to set sheets on the printer side (e.g., in the operation unit 116 of the image forming apparatus 102), the user can easily check and know how to set up sheets and thus can solve the problem of the prior art.

Further, the technique disclosed in Japanese Patent Application Laid-Open No. 2020-113060 requires a user to install a dedicated printer driver for each printer and for each type of sheets, which could be also burdensome. According to the present embodiment, there is no need to install a dedicated printer driver for each printer and for each type of sheets, and the burden on the user can be reduced.

In addition, if a print job in which a sheet name is specified is received while the sheet name has been set in the sheet setting application, the image forming apparatus 102 determines whether or not there is a sheet feeder having a sheet name matching (corresponding to) the sheet name specified in the print job. If there is a sheet feeder having the corresponding sheet name, the image forming apparatus 102 permits to use only that sheet feeder for the printing operation.

If there is no sheet feeder having the matching (corresponding) sheet name, the print job is retained and the printing operation is performed after the sheet feeder is selected by the user. When retaining the print fob, the button of the corresponding sheet setting application is highlighted (for example, by blinking or color-inversing). That is, if the sheet name of the received print setting is different from the sheet name set in the image forming apparatus, the image forming apparatus 102 stops the printing operation, and displays a screen for the user to check the sheet setting, which allows the user to check the sheet setting, and to prevent erroneous printing on the dedicated sheets. As a result, it is possible to solve the problem of wasting the expensive dedicated sheets due to executing a wrong print job on the dedicated sheets that have been preset in the sheet feeder.

If the sheet setting application is executed to change the sheet settings, but sheets preset in the specified sheet feeder are not replaced, the sheet setting screen shown in FIG. 7 or FIG. 8 is displayed when a user attempts to perform a print operation. The user checks if the replacement of sheets in the specified sheet feeder has been made through the displayed sheet setting screen, which prevents the user from forgetting to replace the preset sheets and leaving the preset sheets in the specified sheet feeder. As a result, it is possible to prevent the user from performing a printing operation on the sheets preloaded in the specified sheet feeder prior to performing the sheet setting for the sheet feeder.

As described above, the required sheet size, sheet type, other print settings, and sheet orientation can be set without mistakes by the user. Since the name of the sheet feeder can be changed by executing the sheet setting application, it is possible to clearly indicate that the specified sheet feeder cannot be used for printing on normal sheets and to make the user aware of the above fact. The user knows that the printing operation using the specific sheets can be performed with an image forming apparatus corresponding to the connection destination of the printer driver in which favorite settings corresponding to the sheet names are registered in the favorite 601. Therefore, it is possible to prevent a user from mistakenly selecting a printer to be used for the printing operation. That is, the user can easily select a printer and perform print settings for the dedicated sheets. It is also possible to easily perform a printing operation using the dedicated sheets with settings for the dedicated sheet while perform another printing operation using other sheets with other settings for the other sheets.

Therefore, it is possible to prevent the user from setting wrong sheets or performing a print operation on expensive sheets mistakenly left in the specified sheet feeder, which causes to waste the expensive sheets.

In addition, it is also possible to suppress printing defects such as toner peeling, melting of the glue of the label sheet, or ink bleeding due to unsuitable printing conditions caused by improper print settings.

Second Embodiment

In the first embodiment, the sheet setting application for the sheet setting is installed in the image forming apparatus 102, and the sheet setting information for the sheets associated with the sheet setting application is provided for the printer driver of the PC 103. Further, the printer driver of the PC 103 registers the sheet setting information provided by the image forming apparatus 102 in the favorite settings of the printer driver. In the second embodiment, an application for adding favorite sheets is downloaded from the printer driver distributing server 106 to the PC 103, and the application is executed to add a favorite sheet name to the favorite settings of the printer driver.

Figure 15:
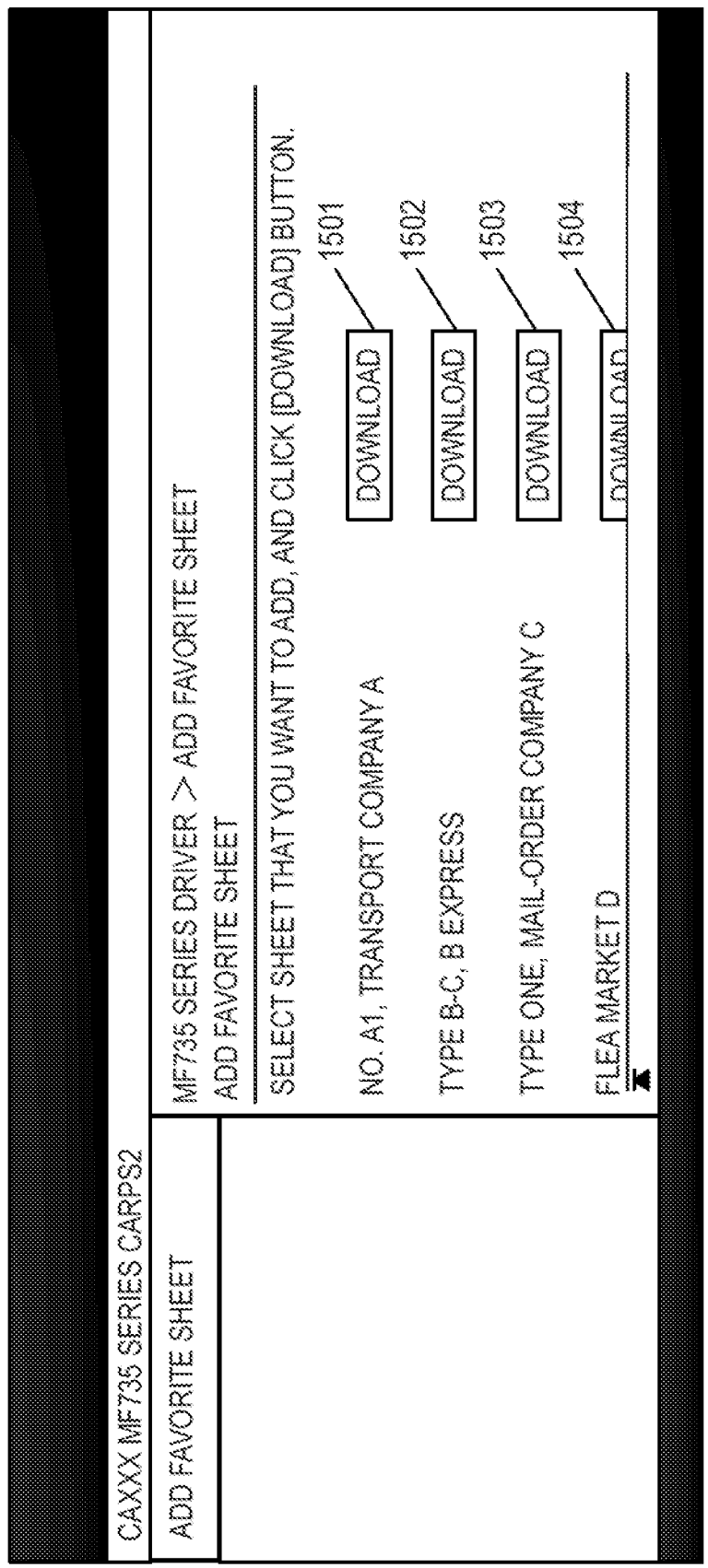
FIG. 15 shows a screen for selecting and adding a favorite application provided by a printer driver distributing server.

FIG. 15 is a diagram showing an example of a screen for selecting a favorite sheet to be added to the printer driver provided by the printer driver distributing server 106. This screen is displayed on a display device (not shown) of the PC 103 in response to accessing the printer driver distributing server 106 from the PC 103.

A download button 1501 is a button for installing an application for adding a favorite setting corresponding to a sheet name "No. A1 of transport company A" on the PC 103. A download button 1502 is a button for installing an application for adding a favorite setting corresponding to a sheet name "type B-C of B express" on the PC 103. A download button 1503 is a button for installing an application for adding a favorite setting corresponding to a sheet name "type one of mail-order company C" on the PC 103. A download button 1504 is a button for installing an application for adding a favorite setting corresponding to a sheet name "flea market D" on the PC 103.

If one of the download buttons 1501 to 1504 is pressed, the application for installing a favorite sheet setting linked to the pressed download button is downloaded from the printer driver distributing server 106 to the PC 103. If the downloaded application is executed by a PC 103, the sheet information corresponding to the executed application is added to the favorite settings of the printer driver.

At this time, information including a sheet size, a sheet type, a sheet orientation, a sheet name, print density, capability of duplex printing, a color profile, an icon image displayed by the operation unit 116 of image forming apparatus 102, and a sheet setting screen is added to the printer driver and held as sheet information. If the addition of the sheet information is completed, the sheet name (sheet type) corresponding to the added sheet information is displayed in the "favorites" of the printer driver as shown in 601 in FIG. 6. If a user selects the favorite setting added to the favorite 601 and instructs a printing operation, a print job including the selected favorite setting as a print setting is transmitted to the image forming apparatus 102. That is, the sheet type corresponding to the received sheet information is added to the print setting screen of the printer driver as one of the options. If the added sheet type is selected and the printing operation is instructed, print data specifying information of the sheets corresponding to the added sheet type is generated.

Figure 16:
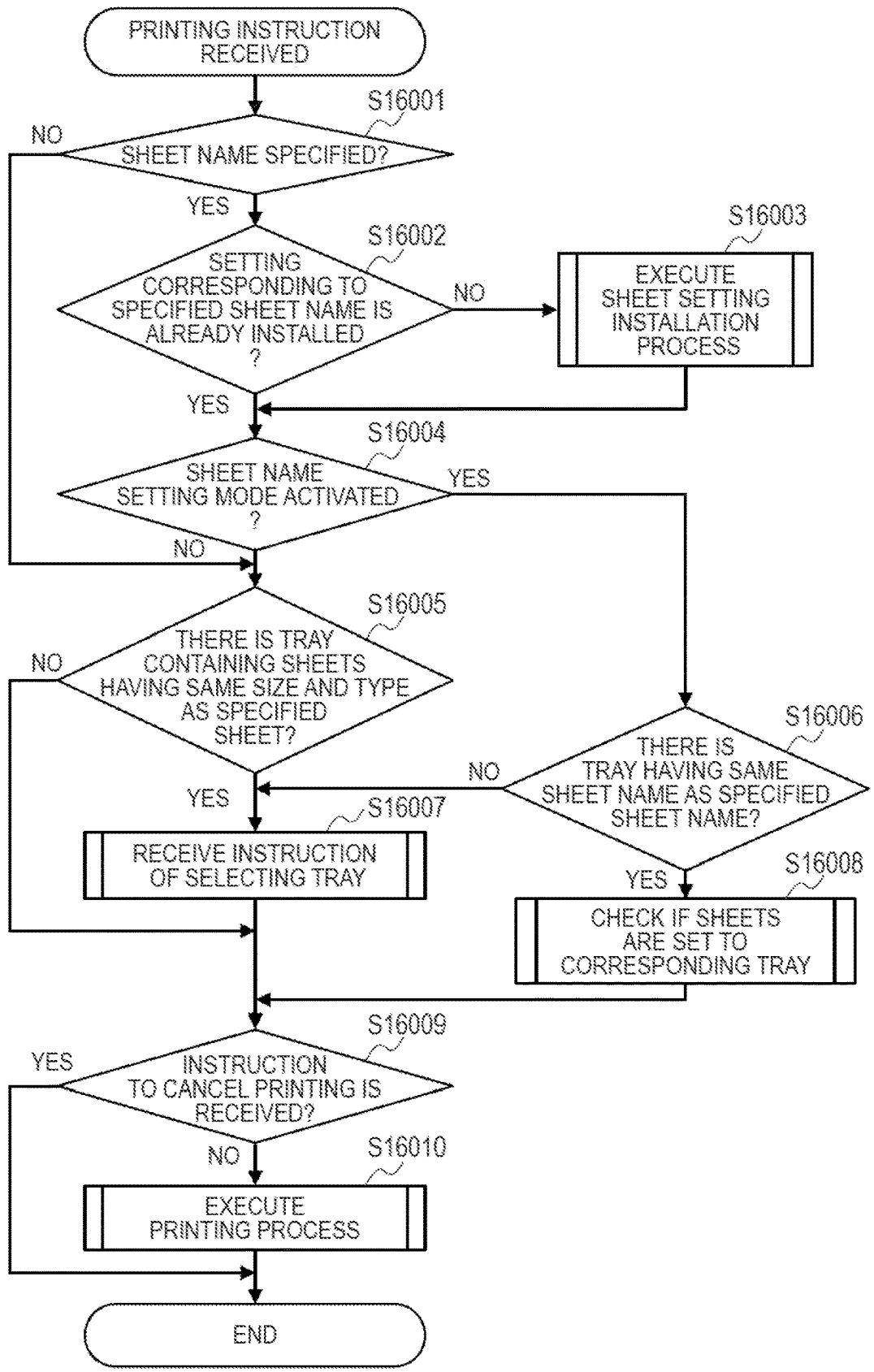
FIG. 16 is a flowchart showing the operation of the image forming apparatus according to the second embodiment if receiving an instruction to execute a printing operation from a personal computer.

FIG. 16 is a flowchart describing an operation if the image forming apparatus 102 according to the second embodiment receives an instruction to perform a printing operation from the PC 103. The processing shown in the flowchart is realized by the CPU 111 reading and executing the control program stored in the ROM 112 or the storage 114.

In receipt of a print job from the PC 103, the CPU 111 starts the process of the flowchart.

First, in step S16001, the CPU 111 determines whether or not a sheet name is specified in the print job input from the PC 103. If there is no sheet name specified (No in step S16001), the CPU 111 advances the process to step S16005.

On the other hand, if there is a sheet name specified (Yes in step S16001), the CPU 111 advances the process to step S16002.

In step S16002, the CPU 111 determines whether or not the sheet name specified in the print job has been already installed in the image forming apparatus 102. The "sheet name having already been installed" refers to a state in which the sheet setting information corresponding to the sheet name is stored in the storage 114 or the like in accordance with a template of the sheet setting application.

In step S16002, if the sheet name specified in the print job has already been installed in the image forming apparatus 102 (Yes in step S16002), the CPU 111 advances the process to step S16004.

On the other hand, if the sheet name specified in the print job has not been installed in the image forming apparatus 102 (No in step S16002), the CPU 111 advances the process to step S16003.

In step S16003, the CPU 111 executes the above-mentioned process for installing sheet settings. In the above installation process, the CPU 111 first acquires sheet setting information from the print setting information included in the print job. The sheet setting information includes information of a sheet size, a sheet type, a sheet orientation, a sheet name, print density, capability of duplex printing, a color profile, an icon image displayed by the operation unit 116, and a sheet setting screen. The CPU 111 stores the acquired sheet setting information in the storage 114 or the like according to a template of the sheet setting application. If the installation process of the sheet setting is completed, the CPU 111 adds a button formed by combining the icon image and the sheet name based on the stored sheet setting information, and displays the button in the operation unit 116. The above button enables to perform the sheet setting for the corresponding sheets. If the installation process of the sheet setting is completed, the CPU 111 advances the process to step S16004. The CPU 111 may automatically activate the sheet name setting mode when the installation process of the sheet setting is completed.

Since the processes of the steps S16004 to S16010 are same as the processes of the steps S14002 to S14008 shown in FIG. 14, the descriptions thereof are omitted.

The sheet name setting mode is cancelled or deactivated if the sheet setting of the sheet feeder is changed.

The printer driver to which the favorite setting has been added by the application for adding favorite sheets may notify the information of the sheet setting added to the favorites when connected to the image forming apparatus 102 (for example, when checking a status). This notification may cause the image forming apparatus 102 to execute the process of installing sheet settings.

As described above, a sheet setting for predetermined sheets can be added to the printer driver of the PC 103 as a favorite setting by using the application for adding favorite sheets. Further, performing a printing operation with the added sheet setting enables to add and set new sheet information to the image forming apparatus 102.

In the second embodiment, the application for adding favorite sheets is acquired from the printer driver distributing server 106, and a new sheet setting is added to the "favorites" of the printer driver by the application for adding favorite sheets. However, the new sheet setting may be added to the "favorites" of the printer driver when updating the printer driver. In this case, the printer driver is considered to provide the information of the sheet setting added to the "favorites" of the printer driver for the image forming apparatus to which printing data is sent.

Third Embodiment

In the third embodiment, an abbreviation of the sheet name is added a hostname notified by the multicast Domain Name Service (multicast DNS) used in the LAN 100 if the sheet name setting mode is activated. Hereinafter, the multicast DNS is referred to as "mDNS".

The image forming apparatus 102 has the ability to announce the own information to all terminals in the LAN 100 using mDNS. The mDNS has a function of sharing DNS records including SRV (service) records, TXT records, PTR records and the like with the terminals in the LAN 100.

The PC 103 and the smartphone 104 receive identification information transmitted by the image forming apparatus 102 through the mDNS. Then, the PC 103 and the smartphone 104 automatically detect the image forming apparatus 102 located in the LAN 100 based on the received identification information, and the detected apparatus can be registered as an image forming apparatus that outputs a result of operations.

FIG. 17 is a flowchart describing an operation of the sheet setting application performed by the image forming apparatus 102 according to the third embodiment. The processing shown in the flowchart is realized by the CPU 111 reading and executing the control program stored in the ROM 112 or the storage 114. The sheet setting application according to the third embodiment is different from of the application of the first embodiment on the process of changing the hostname of the mDNS.

Since the processes of the steps S17001 to S17006 are same as the processes of the steps S9001 to S9006 shown in FIG. 9, the descriptions thereof are omitted. If the processing in step S17006 is completed, the CPU 111 advances the process to step S17007.

In step S17007, the CPU 111 displays a screen for confirming change of a mDNS name as shown in FIG. 20A in the operation unit 116, shows a notice about changing the hostname of the mDNS, and confirms if the user wants to change the hostname of the mDNS.

FIG. 20A shows an example of a screen provided by the sheet setting application for confirming change of the mDNS name.

If the user wants to change the mDNS hostname, the user presses a "OK" button 2101. If the user does not want to change the mDNS hostname, the user presses a "cancel" button 2102.

If the user presses the OK button 2101 or the cancel button 2102, the CPU 111 advances the process to step S17008.

In step S17008, the CPU 111 advances the process to step S17009 if the user changes the mDNS hostname (Yes in step S17008).

In step S17009, the CPU 111 changes the hostname of the mDNS (for example, change the hostname to include an abbreviation of the sheet name) and advances the process to step S17010.

In step S17010, the CPU 111 displays a screen showing contents set for the sheet feeder and the changed hostname of the mDNS as shown in FIG. 20B, and ends the process of the flowchart.

FIG. 20B is a diagram showing an example of a screen provided by the sheet setting application indicating completion of the mDNS name setting and sheet setting.

On the other hand, if the user does not change the mDNS name in step S17008 (No in step S17008), the CPU 111 advances the process to step S17011.

In step S17011, the CPU 111 displays a screen showing the set contents as shown in FIG. 12 or FIG. 13 in the operation unit 116 in a manner similar to the step S9007 of FIG. 6, and ends the process of the flowchart.

It is also possible to display a sheet setting screen as shown in FIG. 7 or FIG. 8 to guide how to set sheets if the "OK" button is pressed in the screen showing the setting contents as shown in FIG. 20B, FIG. 12 or FIG. 13.

FIG. 18 is a diagram describing a sequence of processing in which the PC 103 or the smartphone 104 searches for an image forming apparatus to perform a printing operation.

The PC 103 or the smartphone 104 broadcasts an mDNS search request to all terminals located in the LAN 100 to search for an image forming apparatus (step S1801). For example, Apple's Bonjour (registered trademark) is a protocol that can be used to search for printers and the like connected to a network using mDNS. A process of Apple's AirPrint (registered trademark) finding printers compatible with AirPrint (registered trademark) using Bonjour (registered trademark) corresponds to the process of step S1801.

If the image forming apparatus 102 receives a search request for searching image forming apparatuses, the image forming apparatus 102 generates a DNS record (step S1802), and transmits (i.e., announces) a search response including the DNS record to the LAN 100 (step S1803).

Figure 19A:
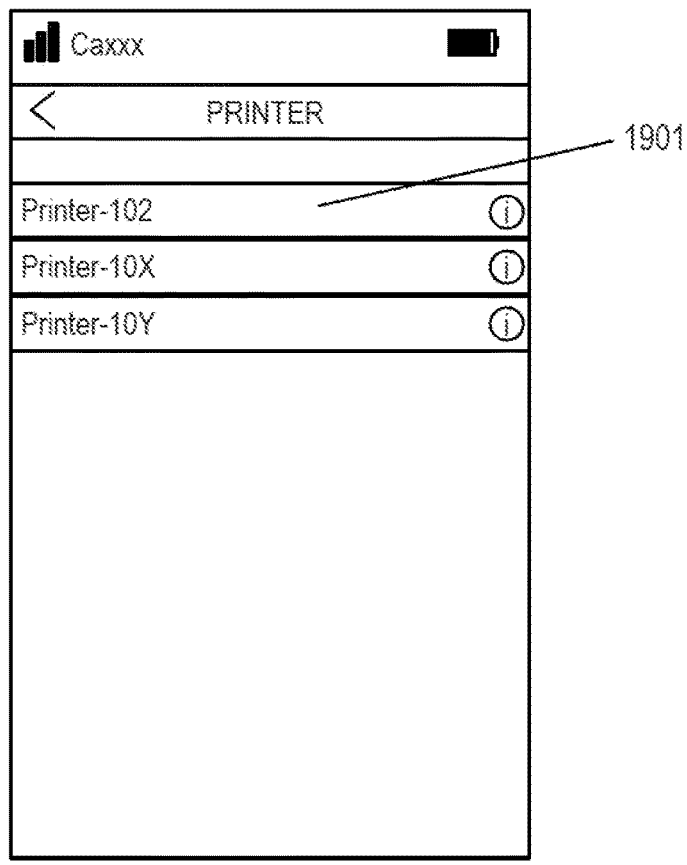
FIG. 19A shows a screen of a printer list displayed on a personal computer or smartphone.
Figure 19B:
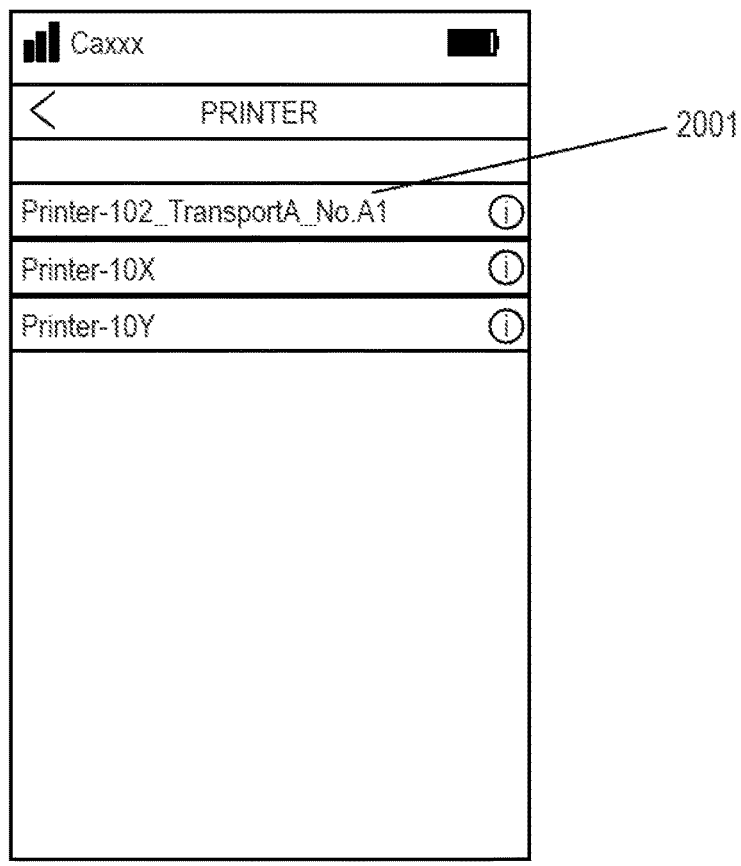
FIG. 19B shows a screen of a printer list displayed on a personal computer or smartphone.

The PC 103 or the smartphone 104 uses the DNS record included in the search response to execute a displaying process (for example, showing a screen of a printer list as shown in FIG. 19A or FIG. 19B) showing image forming apparatuses available to the user (step S1804).

FIGS. 19A and 19B are diagrams showing examples of screens showing a printer list displayed at step S1804 of FIG. 18.

FIG. 19A corresponds to the screen of the printer list if the image forming apparatus 102 is not in the sheet name setting mode, and FIG. 19B corresponds to the screen of the printer list if the image forming apparatus 102 is in the sheet name setting mode. Details will be described later.

The user can select a displayed item corresponding to the image forming apparatus that the user wants to use from the list of image forming apparatuses (e.g., from the printer list screen as shown in FIG. 19A or FIG. 19B) displayed on the PC 103 or the smartphone 104.

If the user selects the image forming apparatus 102, the PC 103 or the smartphone 104 transmits a print job to the selected image forming apparatus (in the above example, to the image forming apparatus 102) (step S1805).

If the image forming apparatus 102 receives the print job, the image forming apparatus 102 executes the printing operation (step S1806).

In referring now to FIGS. 19A and 19B, the screens of printer list displayed at step S1804 of FIG. 18 will be described.

If the image forming apparatus 102 has not shifted to the sheet name setting mode, the image forming apparatus 102 sets "Printer-102" as the hostname in the DNS record and executes the search response in step S1803 of FIG. 18. The SRV record is used as an announcing method to the local area network. The SRV record includes a name, contents, and priority setting, and "Printer-102" is set as a name. The PC 103 or the smartphone 104 acquires "Printer-102" as the hostname from the SRV record of the DNS record in the received search response, and displays the acquired name as shown in a name 1901 of FIG. 19A. If the user selects the name 1901 and executes a printing operation, the PC 103 or the smartphone 104 transmits the print job to the image forming apparatus 102.

If the image forming apparatus 102 shifts to the sheet name setting mode of "No. A1 of transport company A", the image forming apparatus 102 adds "TransportA_No. A1", which is an abbreviation of "No. A1 of transport company A" as a sheet name, to the trailing end of the hostname of the DNS record. As a result, the name of the SRV record in the DNS record is set to "Printer-102_TransportA_No. A1". The PC 103 or the smartphone 104 acquires "Printer-102_TransportA_No. A1" as the hostname from the SRV record in the DNS record of the received search response, and displays the acquired name as shown in a name 2001 shown in FIG. 19B. If the user selects the name 2001 to execute the printing operation, the PC 103 or the smartphone 104 transmits the print job to the image forming apparatus 102.

If the sheet setting of the sheet feeder set by the sheet setting application is changed, the image forming apparatus 102 cancels the sheet name setting mode, deletes the sheet name from the hostname of the mDNS, and returns the hostname of the mDNS to the original hostname (i.e., the hostname before the change).

As described above, the image forming apparatus 102 can add a sheet name to the hostname of the mDNS if the sheet setting is performed by executing the sheet setting application linked to the buttons 309, 310, etc. (i.e., in case of the sheet name setting mode being activated). Adding the sheet name to the hostname as shown above allows the user to confirm via the PC 103 or the smartphone 104 that the image forming apparatus 102 is in the sheet name setting mode and specific sheets are set. That is, for example, the user can confirm a printer in which desired sheets are loaded and execute a printing operation through an application such as Apple's AirPrint (registered trademark) of a smartphone or tablet terminal. That is, it is possible to confirm that specific sheets are set from a list of image forming apparatuses displayed on the PC 103 or the smartphone 104, which can prevent the user from performing a printing operation with wrong sheet settings via the PC 103 or the smartphone 104. Therefore, it is possible to surely select a printer in which desired sheets are loaded to perform a printing operation.

In each of the above embodiments, if the sheet setting of the sheet feeder set by the sheet setting application is changed, the image forming apparatus 102 may cancel the sheet name setting mode, and display in the operation unit 116 a message urging the user to replace the sheets loaded in the sheet feeder. Displaying such a message allows to prevent the user from performing other printing operations on the expensive dedicated sheets mistakenly left to be loaded in the sheet feeder.

As described above, according to the respective embodiments, the user can easily specify (e.g., just select one from favorites) a print setting suitable for special sheets such as dedicated sheets using a printer driver to perform a printing operation. As a result, the user can perform a printing operation with a print setting suitable for the dedicated sheets, and avoid wasting expensive dedicated sheets due to printing failure or the like.

The structure and contents of the various data described above are not limited to the above descriptions, and the various data may have various structures and contents depending on the use and purpose.

Although some embodiments have been described above, the present invention may be implemented as, for example, a system, apparatus, method, program, storage medium, or the like. Specifically, the present invention may be applied to a system comprising multiple apparatuses, or may be applied to a device comprising a single apparatus.

In addition, all of the configurations formed by combining the above embodiments are also included in the scope of the present invention.

According to the present invention, the user can easily specify a setting suitable for special sheets such as a dedicated sheet through a printer driver to perform a printing operation. As a result, the user can perform a printing operation with a setting suitable for the dedicated sheets, and avoid wasting expensive dedicated sheets due to printing failure or the like.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-173914 filed Oct. 25, 2021, which is hereby incorporated by reference herein in its entirety.

What is claimed is:

1. An image forming apparatus comprising:
a printer;
a controller that installs an application in the image forming apparatus, the application holding sheet setting information for a predetermined sheet; and
a communicator that transmits the sheet setting information held by the installed application to a printer driver installed in an information processing apparatus connected to the image forming apparatus,
wherein the communicator receives a print job including the sheet setting information from the information processing apparatus, and
wherein the printer prints, based on the sheet setting information included in the received print job, an image on the predetermined sheet.

2. The image forming apparatus according to claim 1, wherein the sheet setting information includes a name of sheet, a size of sheet, a type of sheet, and an orientation of sheet.

3. The image forming apparatus according to claim 2, wherein the sheet setting information further includes at least one of printing density, capability of duplex printing, and a color profile.

4. The image forming apparatus according to claim 1,
wherein the controller controls a feeder set by the application not to feed a sheet if a sheet specified by the received print job does not match a sheet set by the application.

5. The image forming apparatus according to claim 4, wherein, if the sheet specified by the print job matches the sheet set by the application, the controller initiates a printing operation based on the print job on condition that a user has performed a predetermined operation to check whether a sheet is set after the sheet setting by the application.

6. The image forming apparatus according to claim 5, wherein the predetermined operation is opening and closing the feeder set by the application.

7. The image forming apparatus according to claim 5, wherein, if the condition is not satisfied, the controller displays how to set the predetermined sheet on a display unit, and initiates the printing operation based on the print job after the user having performed the predetermined operation to check whether the sheet is set.

8. The image forming apparatus according to claim 4, wherein the controller displays how to set the predetermined sheet on a display if the sheet setting is executed by the application.

9. A method of controlling an image forming apparatus including a printer, a controller, and a communicator, the method comprising:
- the controller installing an application in the image forming apparatus, the application holding sheet setting information for a predetermined sheet; and
- the communicator transmitting the sheet setting information held by the installed application to a printer driver installed in an information processing apparatus connected to the image forming apparatus;
- the communicator receiving a print job including the sheet setting information from the information processing apparatus, and
- the printer printing, based on the sheet setting information included in the received print job, an image on the predetermined sheet.

* * * * *